United States Patent [19]

Kozawa et al.

[11] Patent Number: 5,537,733
[45] Date of Patent: Jul. 23, 1996

[54] METHOD OF MANUFACTURING A NICKEL-METAL HYDRIDE SECONDARY CELL

[75] Inventors: Hideaki Kozawa; Kazuo Kojima; Tomoyuki Ono, all of Yokohama; Hirofumi Yanagawa, Kawasaki; Hideaki Kitazume; Kouji Taguchi, both of Yokohama, all of Japan

[73] Assignee: Toshiba Battery Co., Ltd., Tokyo, Japan

[21] Appl. No.: 298,670

[22] Filed: Aug. 31, 1994

Related U.S. Application Data

[62] Division of Ser. No. 95,429, Jul. 23, 1993, Pat. No. 5,372,897.

[30] Foreign Application Priority Data

| Jul. 24, 1992 | [JP] | Japan | 4-198613 |
| Feb. 5, 1993 | [JP] | Japan | 5-18721 |
| Mar. 1, 1993 | [JP] | Japan | 5-39896 |
| Mar. 10, 1993 | [JP] | Japan | 5-48975 |

[51] Int. Cl.$^6$ ............... H01M 10/28; H01M 10/30
[52] U.S. Cl. ............ 29/623.5; 29/623.1; 429/59; 429/185; 429/223
[58] Field of Search ............... 429/59, 175, 185, 429/223, 50; 29/623.1, 623.5

[56] References Cited

U.S. PATENT DOCUMENTS 4,977,043  12/1990  Kadouchi et al. .................. 429/59
5,322,527  6/1994  Furukawa .......................... 29/623.5

*Primary Examiner*—John S. Maples
*Attorney, Agent, or Firm*—Oblon, Spivak, McLelland, Maier & Neustadt

[57] ABSTRACT

A rectangular nickel-metal hydride secondary cell permits improving the air-tightness and also permits preventing a metal case from being deformed in a step of folding an open end portion of the metal case. The rectangular nickel-metal hydride secondary cell, includes a rectangular cylindrical metal case having a bottom, an electrode group housed in the metal case, an alkali electrolyte contained in the metal case, a rectangular sealing plate mounted near the open end portion of the metal case. An insulating gasket is interposed in a compressed state between the inner wall near the open end of the metal case and the sealing plate. The metal case comprises a folded portion formed by inwardly folding the open end portion of the metal case and an inwardly projecting stepped portion formed along the inner surface of the metal case below the folded portion. The sealing plate is fixed to the metal case at the portion between the folded portion and the stepped portion of the metal case with the insulating gasket interposed therebetween, the folded portion at a corner portion of the open end portion of the metal case has an angle of 80° to 100°. Such a secondary cell can be formed by a process which includes charging-discharging cycles, an aging step, and a full charging step.

10 Claims, 27 Drawing Sheets

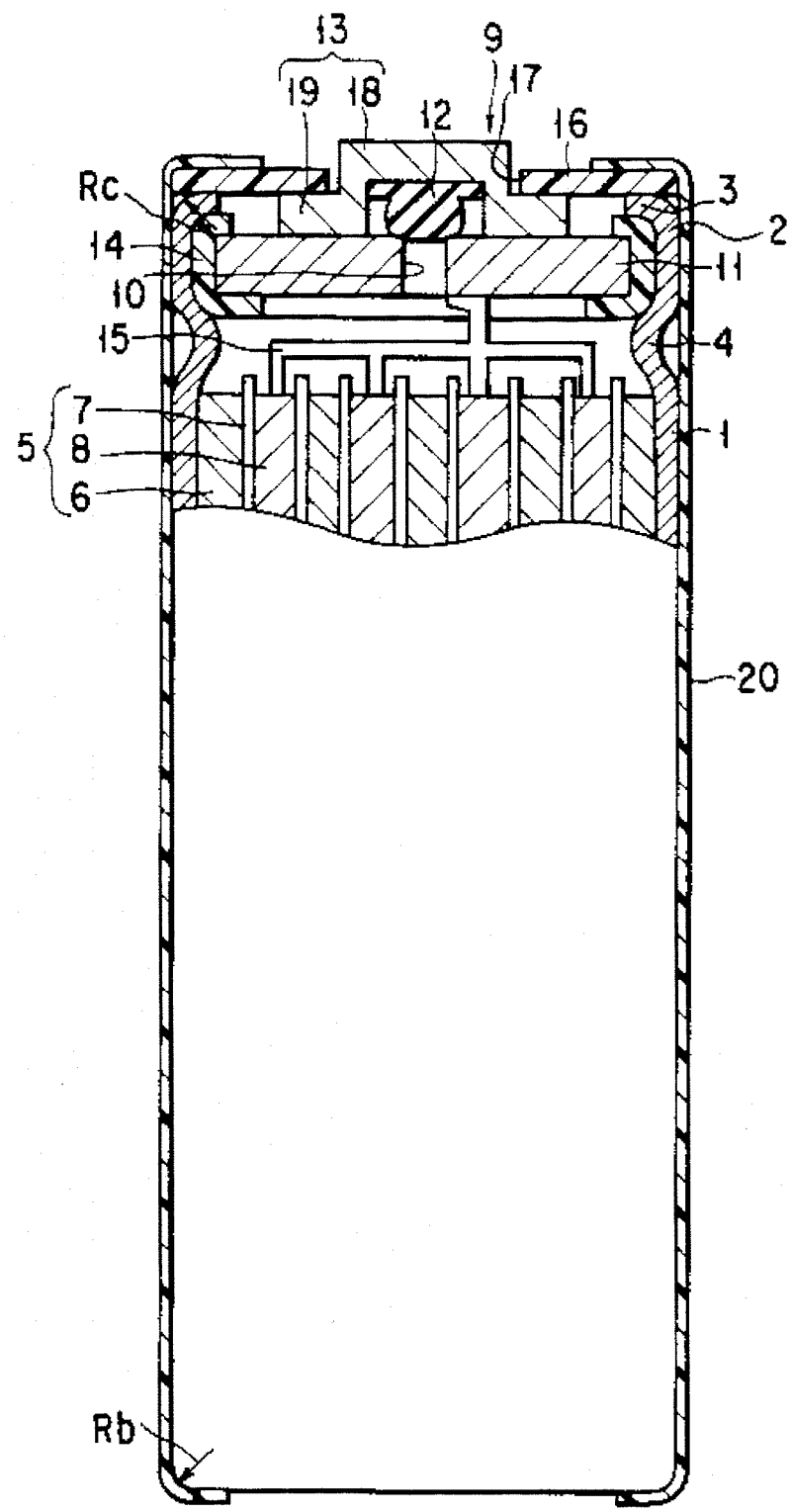
F I G. 1

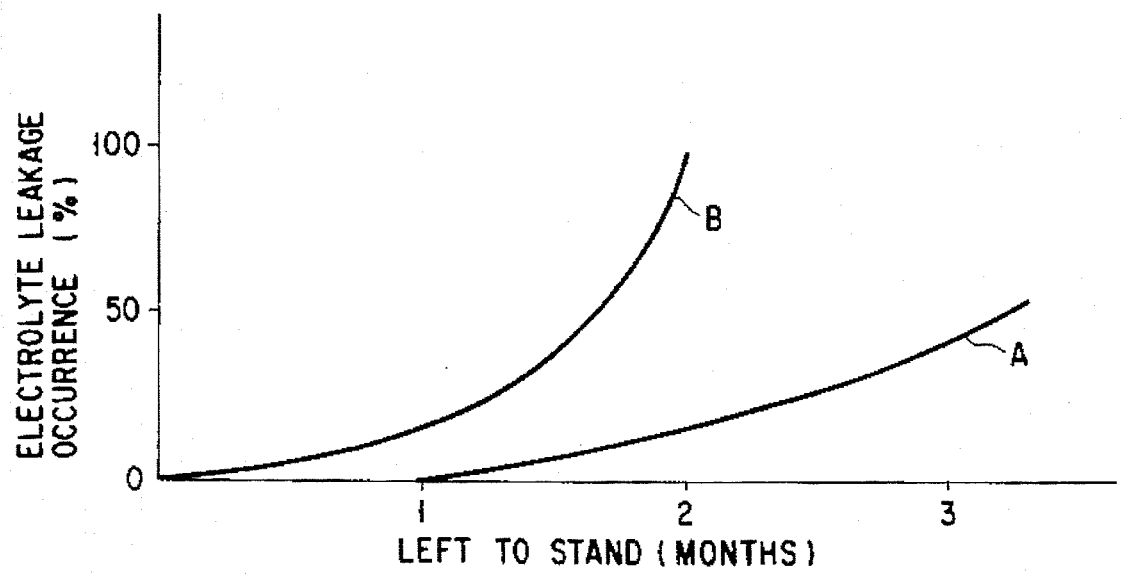
F I G. 6
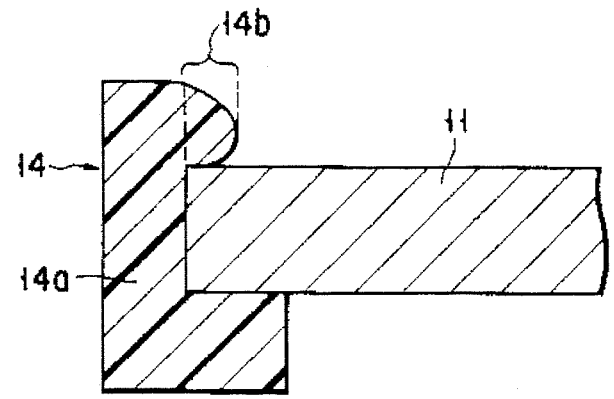
F I G. 7

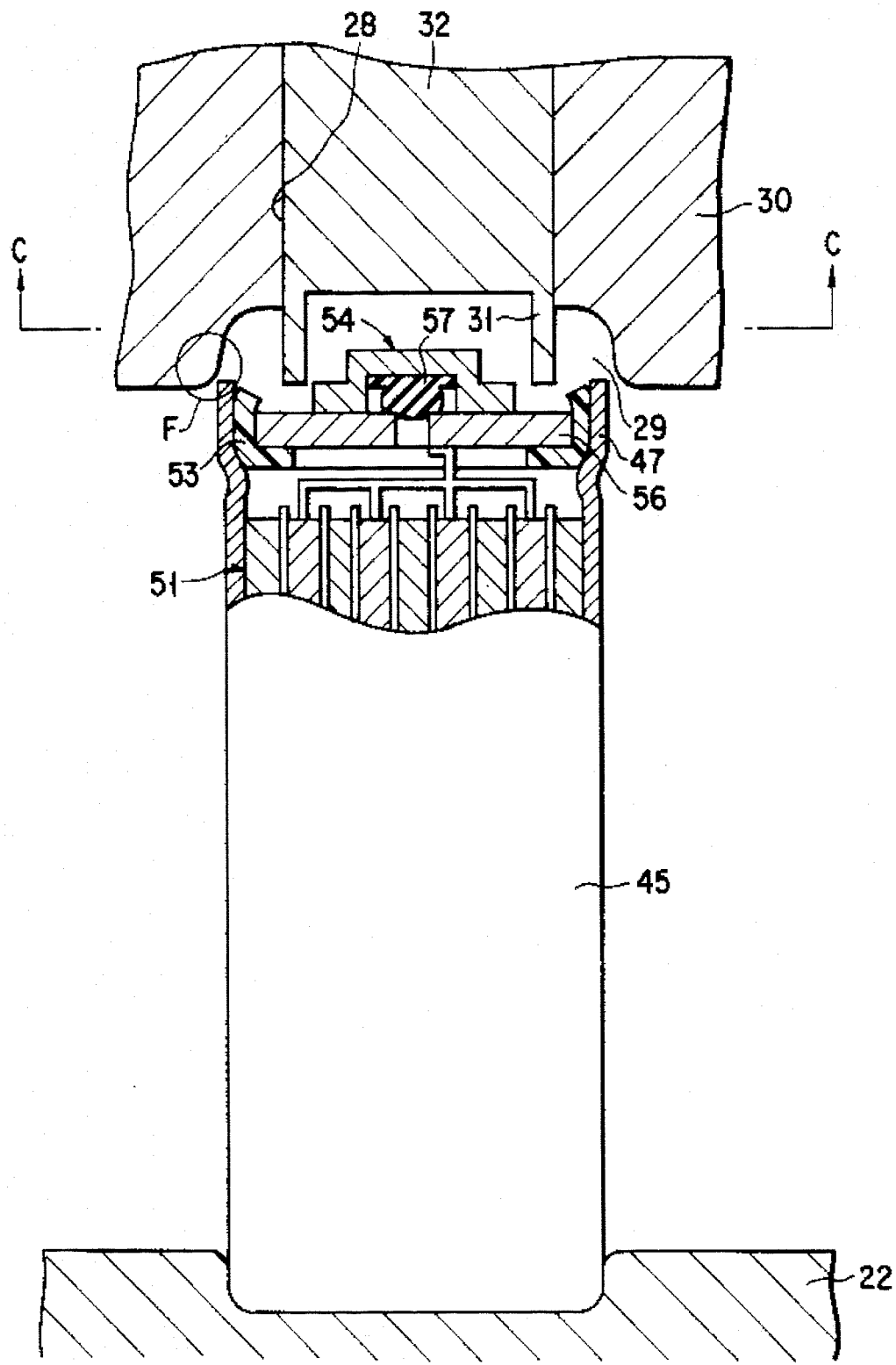
F I G. 11C

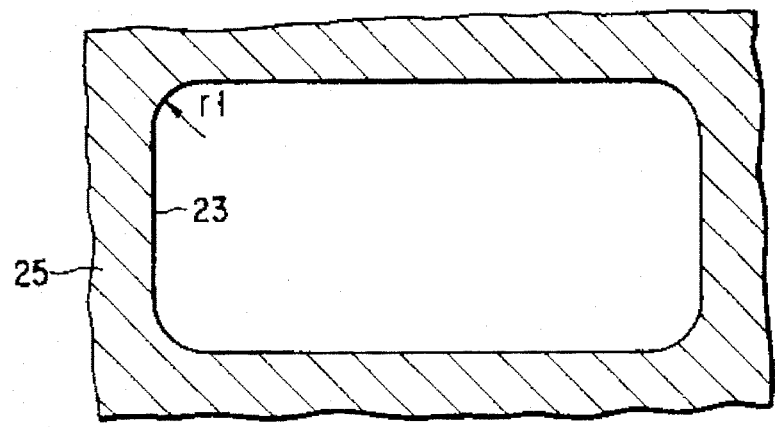
F I G. 12
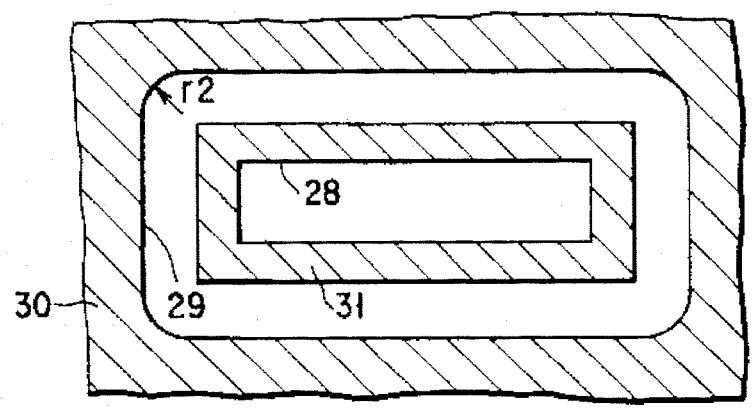
F I G. 13
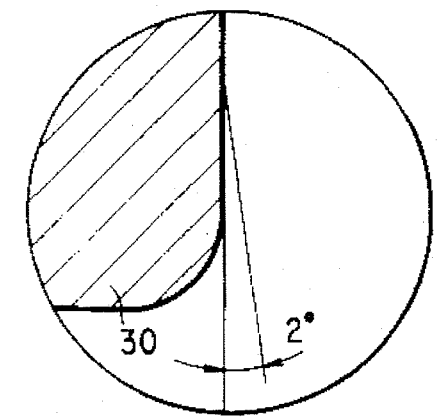
F I G. 14

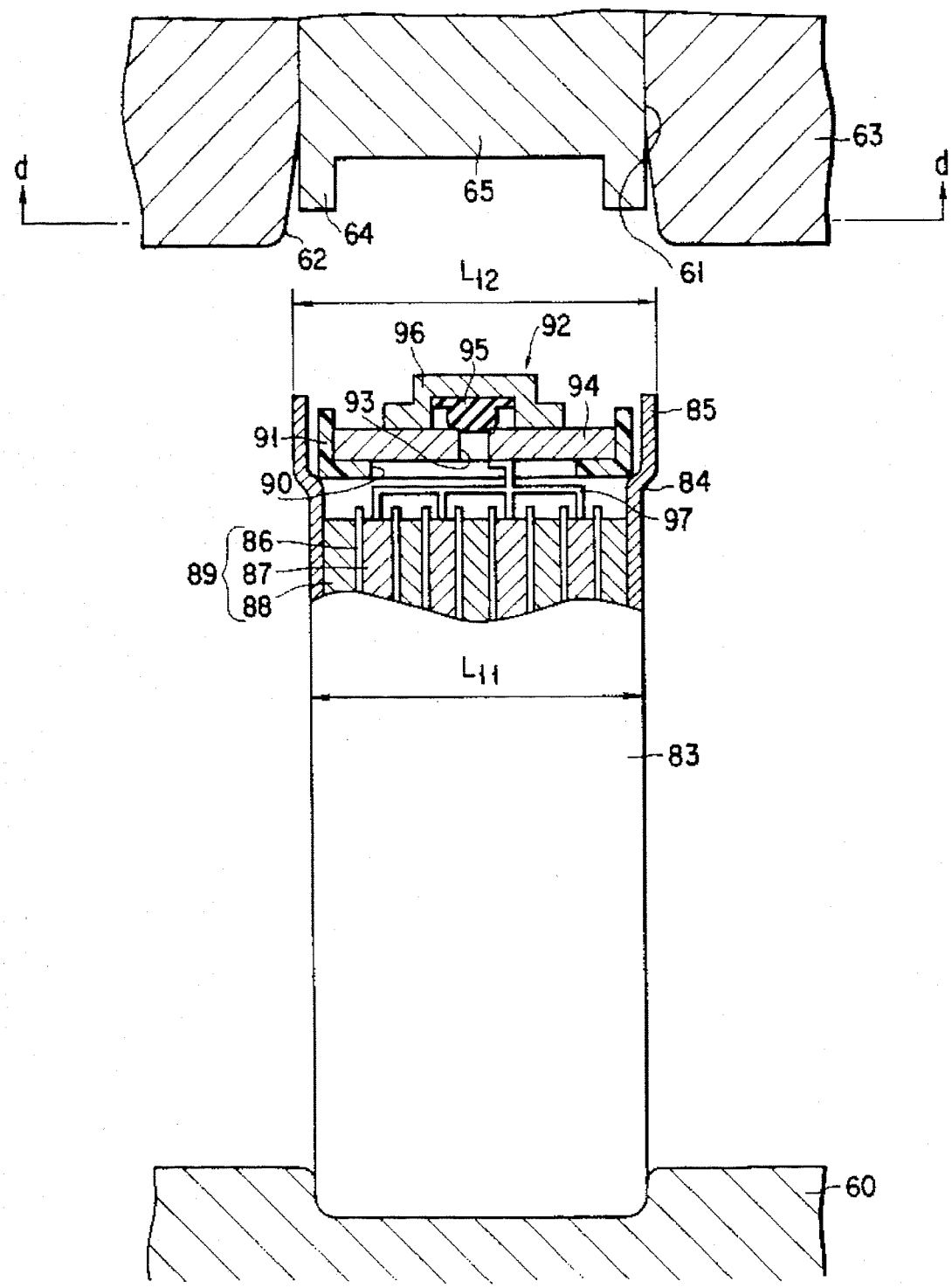
F I G. 15A

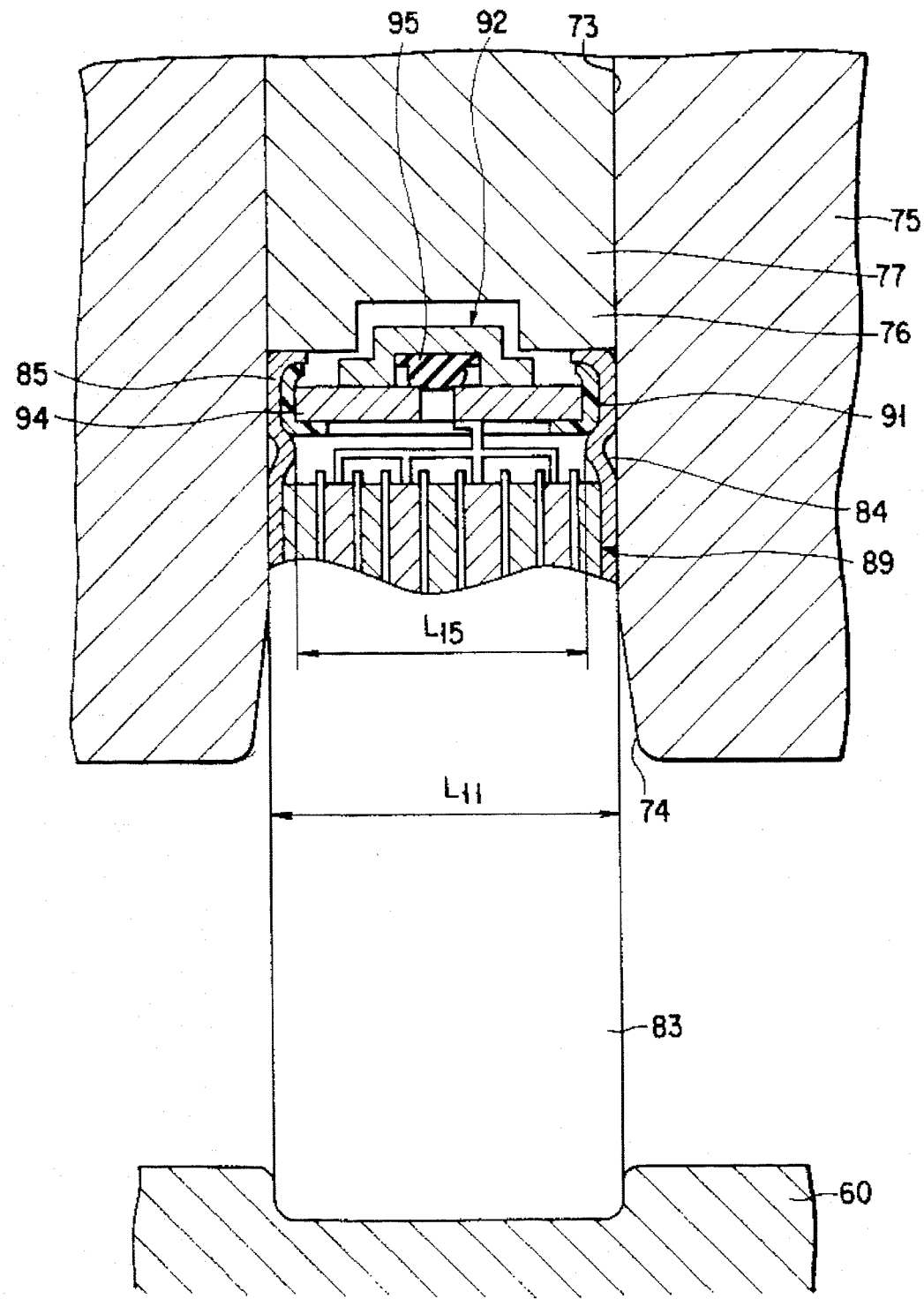
F I G. 15F

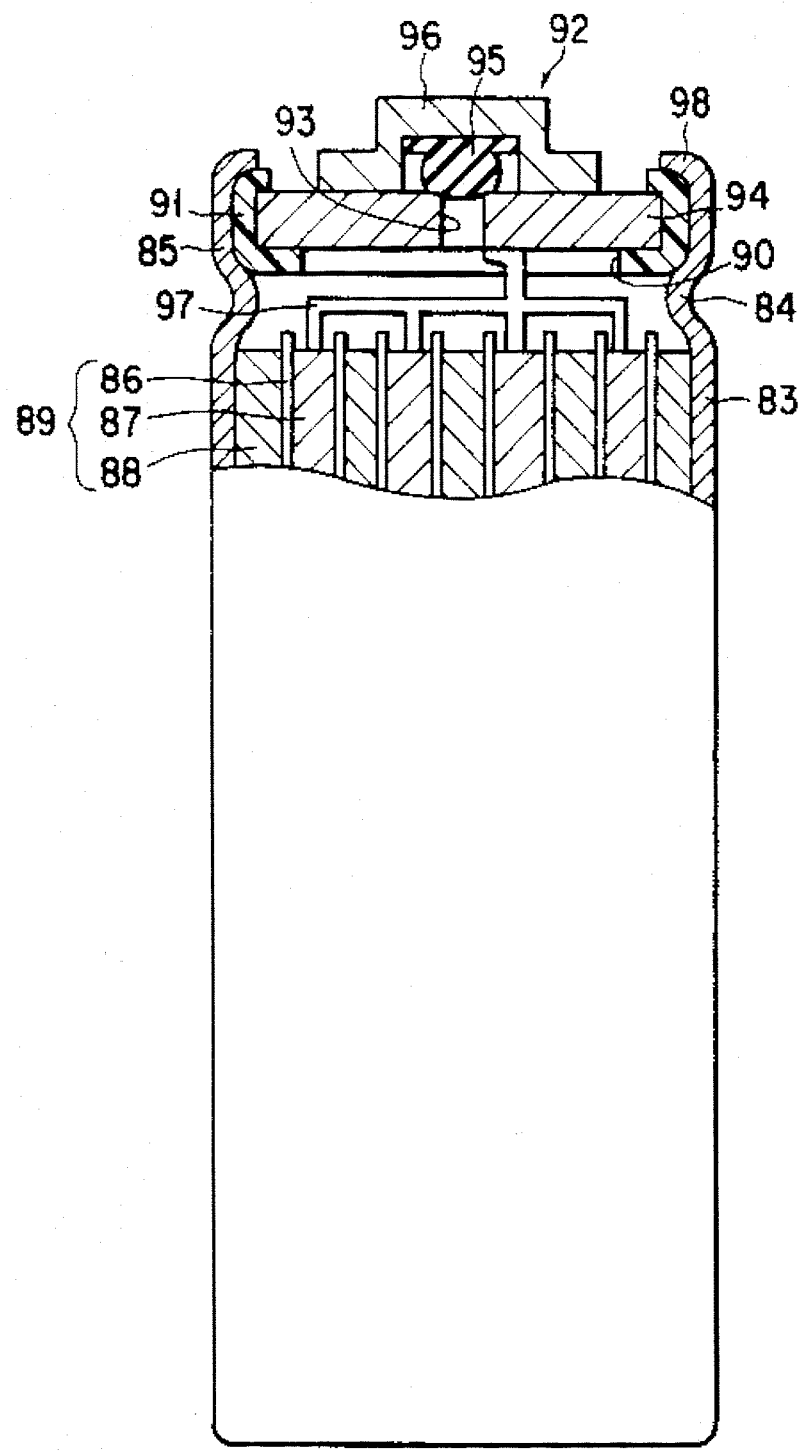
F I G. 15I

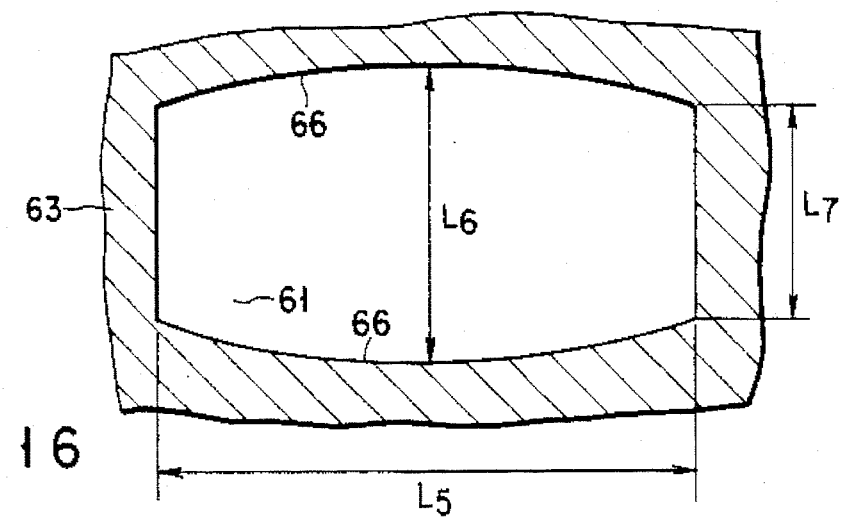
F I G. 16
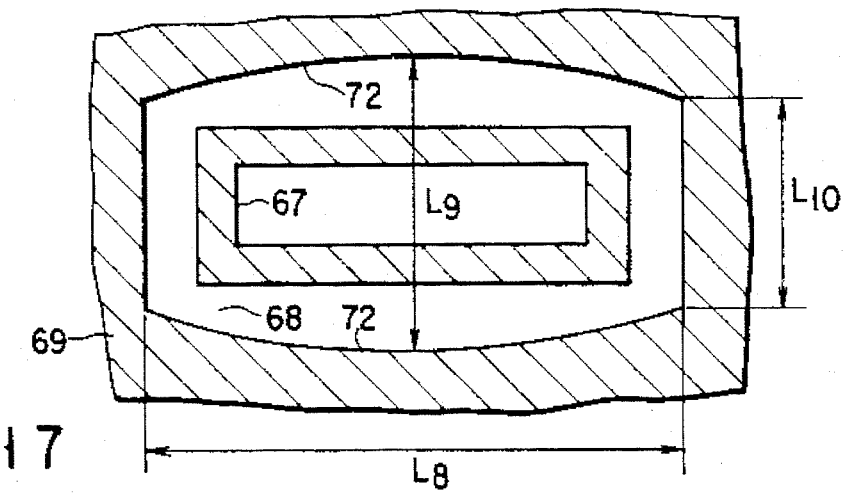
F I G. 17
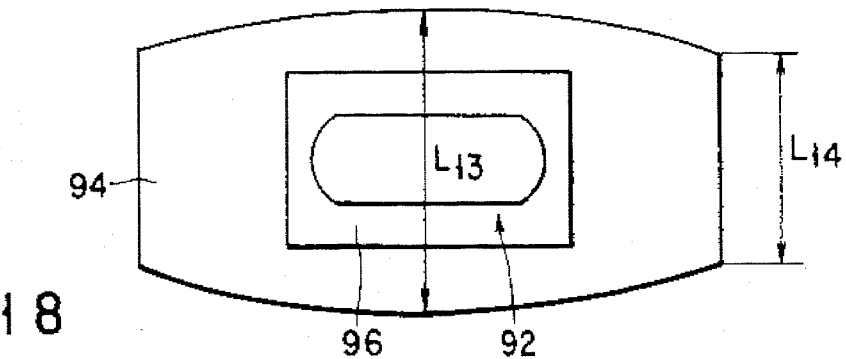
F I G. 18

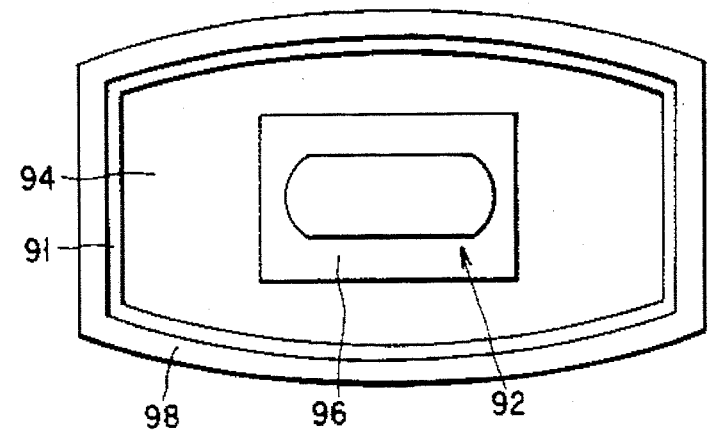
F I G. 19
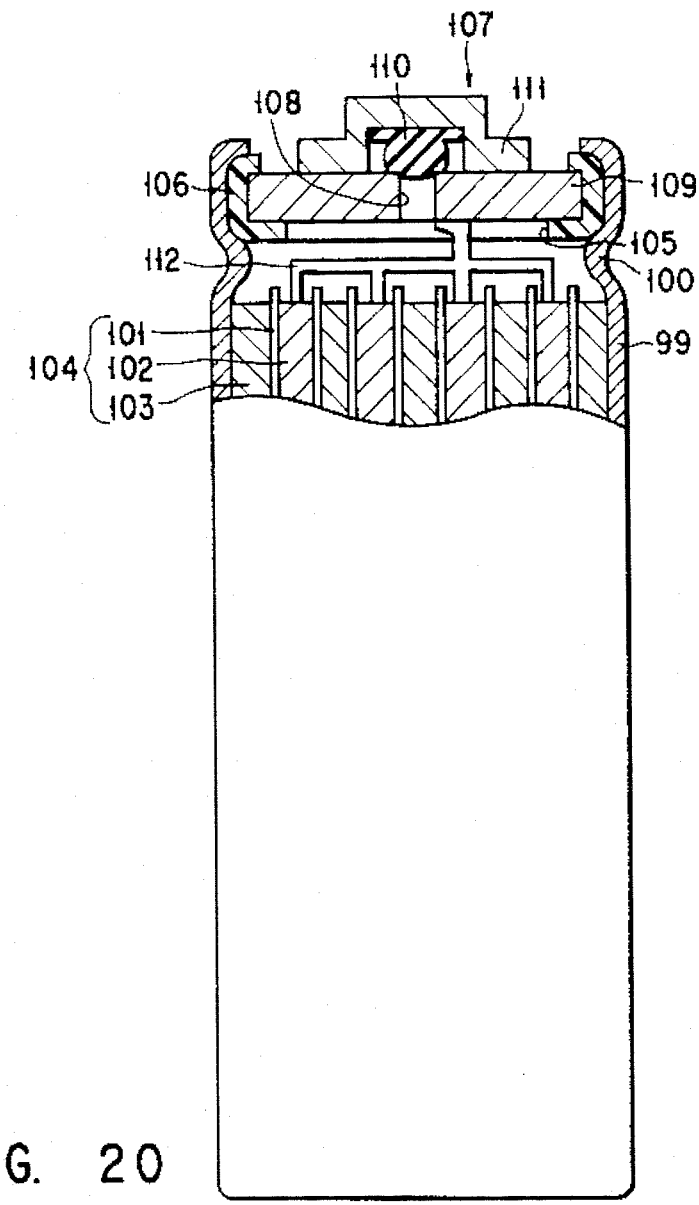
F I G. 20

METHOD OF MANUFACTURING A NICKEL-METAL HYDRIDE SECONDARY CELL

This is a division of application Ser. No. 08/095,429, filed on Jul. 23, 1993, now U.S. Pat. No. 5,372,897.

BACKGROUND OF THE INVENTION

1. Field of the Invention

The present invention relates to a rectangular nickel-metal hydride secondary cell.

A rectangular nickel-metal hydride secondary cell permits an energy density higher than that of a rectangular nickel-cadmium cell and, thus, is used widely nowadays. Because of the high energy density achieved by the rectangular nickel-metal hydride secondary cell, it is necessary to ensure an excellent air-tightness even in the event of heat generation caused by, for example, over-charging.

In general, the rectangular nickel-metal hydride secondary cell comprises a rectangular cylindrical metal case having a bottom. The open peripheral portion of the metal case is inwardly folded to form a folded portion. Also, an inwardly projecting stepped portion is formed below the folded portion of the metal case. An electrode group is housed in the metal case. The electrode group is constructed such that a nickel positive electrode and a hydrogen absorption alloy negative electrode are alternately superposed one upon the other with a separator interposed between the adjacent nickel electrode and the hydrogen absorption alloy electrode. An alkali electrolyte is also contained in the metal case. The secondary cell further comprises a rectangular sealing plate, which is fixed to the metal case at the position with an insulating gasket between the folded portion and the stepped portion, and the insulating gasket formed of a synthetic resin and positioned along the inner wall of the metal case. The gasket is interposed under a compressed state between the open end portion of the metal case and the periphery of the sealing plate so as to hold the peripheral portion of the sealing plate.

In the secondary cell of the construction described above, the sealing plate and the insulating gasket are fixed to the open end portion of the metal case, as follows. In the first step, the insulating gasket holding the sealing plate is mounted on a stepped portion along the inner surface of the metal case. Then, the open end portion of the metal case is pressed to reduce the diameter of the metal case in this portion, followed by inwardly folding the open end portion of the metal case so as to fix the sealing plate together with the insulating gasket to the inner surface of the metal case in a region near the open end portion.

As described above, an operation for reducing the diameter in the open end portion of the metal case is included in the process. What should be noted is that the material of the metal case in the shrunk portion is distributed so as to be concentrated on the four corner portions in the open end portion of the metal case, which is rectangular in cross section. Naturally, the corner portion is rendered higher than the central portion of the side positioned between two adjacent corner portions. When the open end portion having the particular shape is inwardly folded, the folding angle of the corner portion is rendered greater than that in the central portion of the side, giving rise to a problem that the air-tightness of the secondary cell is changed depending on the folding angle of the corner portion. To be more specific, if the folding angle of the corner portion is increased in an attempt to improve the air-tightness, an excessive force is applied to the corner portion of the metal case. Therefore, the metal case occurs deformation such as deflection or strain. On the other hand, if the folding angle of the corner portion is diminished in an attempt to prevent the metal case from being deformed, the air-tightness of the secondary cell is markedly lowered.

SUMMARY OF THE INVENTION

An object of the present invention is to provide a rectangular nickel-metal hydride secondary cell which permits improving the air-tightness and also permits preventing a metal case from being deformed in the step of folding an open end portion of the metal case.

Another object of the present invention is to provide a method of manufacturing a rectangular nickel-metal hydride secondary cell, which permits curling in a desired shape the upper end of the open end portion of the metal case after the diameter-reducing treatment, which permits readily removing the curling mold from the metal case, and which permits improving the air-tightness of the manufactured cell.

Another object is to provide a method of manufacturing a rectangular nickel-metal hydride secondary cell, which permits preventing a sealing plate from being deformed in the sealing step and also permits improving the air-tightness of the manufactured cell.

Still another object is to provide a method of manufacturing a rectangular nickel-metal hydride cell, which permits sufficiently improving the discharge capacity and the discharge voltage before the capacity screening inspection.

According to a first embodiment of the present invention, there is provided a rectangular nickel-metal hydride secondary cell, comprising a rectangular cylindrical metal case having a bottom; an electrode group housed in the metal case and constructed such that a nickel positive electrode and a hydrogen absorption alloy negative electrode are alternately superposed one upon the other with a separator interposed between the positive and negative electrodes; an alkali electrolyte contained in the metal case; a rectangular sealing plate mounted near the open end portion of the metal case; and an insulating gasket formed of a synthetic resin and interposed in a compressed state between the inner wall near the open end of the metal case and the peripheral portion of the sealing plate; wherein the metal case comprises a folded portion formed by inwardly folding the open end portion of the metal case and an inwardly projecting stepped portion formed along the inner surface of the metal case below the folded portion, the sealing plate is fixed to the metal case with the insulating gasket at the portion between the folded portion and the stepped portion of the metal case, the folded portion at a corner portion of the open end portion of the metal case has an angle of 80° to 100°, and the folded portion at the side positioned between two adjacent corners of the open end portion of the metal case has an angle smaller than that of the corner portion.

According to a second embodiment of the present invention, there is provided a method of manufacturing a rectangular nickel-metal hydride secondary cell, comprising the steps of:

housing an electrode group and an alkali electrolyte in a rectangular cylindrical metal case having a bottom and a stepped portion formed along the inner surface of the metal case by enlarging the open end portion of the metal case, the electrode group being constructed such that a nickel positive electrode and a hydrogen absorption alloy negative electrode are superposed one upon the other with a separator interposed between the adjacent positive and negative electrodes;

mounting a rectangular cylindrical insulating gasket having a bottom and a rectangular sealing plate housed therein in advance on the stepped portion of the metal case, a rectangular hole being formed in the bottom of the insulating gasket;

reducing the diameter of the open end portion of the metal case to a value substantially equal to that of the main body portion of the metal case by inserting the open end portion of the metal case to a drawing mold so as to press inward the rising wall of the insulating gasket, the mold having a rectangular hollow in the central portion and a tapered portion formed by outwardly enlarging the inner surface of the hollow in the lower portion of the mold;

abutting a curling mold against the open end portion of the metal case by dropping the curling mold to the metal case so as to inwardly fold the open end portion of the metal case and, thus, to permit the sealing plate to be fixed under pressure to the metal case with the insulating gasket interposed therebetween, the curling mold having a rectangular hollow in the central portion, a rectangular recess formed in the bottom portion to communicate with the hollow and sized larger than the hollow, and a tapered portion formed in the inner surface in the lower end portion of the recess, the tapered portion having an angle of 0.5° to 10°; and raising the curling mold while holding downward the sealing plate with knock-out vertically movable within the hollow of the curling mold so as to detach the curling mold from the metal case.

According to a third embodiment of the present invention, there is provided a method of manufacturing a rectangular nickel-metal hydride secondary cell, comprising the steps of:

housing an electrode group and an alkali electrolyte in a rectangular cylindrical metal case having a bottom and a stepped portion along the inner surface of the metal case formed by enlarging the open end portion of the metal case, the electrode group being constructed such that a nickel positive electrode and a hydrogen absorption alloy negative electrode are superposed one upon the other with a separator interposed between the adjacent positive and negative electrodes;

mounting a rectangular cylindrical insulating gasket having a bottom and a rectangular sealing plate housed therein in advance on the stepped portion of the metal case, a rectangular hole being formed in the bottom of the insulating gasket, and the sealing plate having longer side surfaces which are curved outward;

reducing the diameter of the open end portion of the metal case to a value substantially equal to that of the main body portion of the metal case by using a drawing mold so as to press inwards the rising wall of the insulating gasket, the mold having a rectangular hollow in the central portion and a tapered portion formed by outwardly enlarging the inner surface of the hollow in the lower portion of the mold; and abutting a curling mold against the open end portion of the metal case so as to inwardly fold the open end portion of the metal case to form a folded portion and, thus, to permit the sealing plate to be fixed under pressure to the metal case with the insulating gasket interposed therebetween, the curling mold having a rectangular hollow in the central portion, a rectangular recess formed in the bottom portion to communicate with the hollow and sized larger than the hollow, and a tapered portion formed in the inner surface in the lower end portion of the recess;

wherein the hollow of the drawing mold has outwardly curved inner surfaces in the regions corresponding to the curved side surfaces of the sealing plate, and the recess included in the curling mold has outwardly curved inner surfaces in the regions corresponding to the curved side surfaces of the sealing plate.

Further, according to a fourth embodiment of the present invention, there is provided a method of manufacturing a rectangular nickel-metal hydride secondary cell, comprising the steps of:

applying at least one cycle of charging-discharging cycles to a rectangular nickel-metal hydride secondary cell including an electrode group and an alkali electrolyte, the electrode group being constructed such that a nickel positive electrode and a hydrogen absorption alloy negative electrode are superposed one upon the other with a separator interposed between the adjacent positive and negative electrodes;

permitting the secondary cell with a small residual capacity to stand for aging; and fully charging the secondary cell after the aging step, followed by discharging the secondary cell so as to perform a capacity screening inspection of the secondary cell.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a cross sectional view showing a rectangular nickel-metal hydride secondary cell in Example 1 of the present invention;

FIG. 6 is a graph showing the relationship between the leaving time and the electrolyte leakage occurrence in the rectangular nickel-metal hydride secondary cell in Example 1 of the present invention;

FIG. 7 is a cross sectional view showing a partial portion of a rectangular nickel-metal hydride secondary cell according to another embodiment of the present invention;

FIGS. 11A to 11I are cross sectional views collectively showing a method of manufacturing a rectangular nickel-metal hydride secondary cell in Example 2 of the present invention;

FIG. 12 is a cross sectional view along line b—b shown in FIG. 11A, the cross sectional view showing the drawing mold;

FIG. 13 is a cross sectional view along line c—c shown in FIG. 11C, the cross sectional view showing the curling mold;

FIG. 14 is a cross sectional view showing in a magnified fashion a portion F included in FIG. 11C;

FIGS. 15A to 15I are cross sectional views collectively showing a method of manufacturing a rectangular nickel-metal hydride secondary cell in Example 3 of the present invention;

FIG. 16 is a cross sectional view along line d—d shown in FIG. 15A, the cross sectional view showing the drawing mold;

FIG. 17 is a cross sectional view along line e—e shown in FIG. 15C, the cross sectional view showing the curling mold;

FIG. 18 is a plan view showing a group of sealing lids performing an explosion-preventing function and acting as a terminal;

FIG. 19 is a plan view showing the secondary cell shown in FIG. 15I;

FIG. 20 is a cross sectional view showing a rectangular nickel-metal hydride secondary cell manufactured by the methods employed in Examples 4 to 8 of the present invention;

DETAILED DESCRIPTION OF THE PREFERRED EMBODIMENTS

Figure 2:
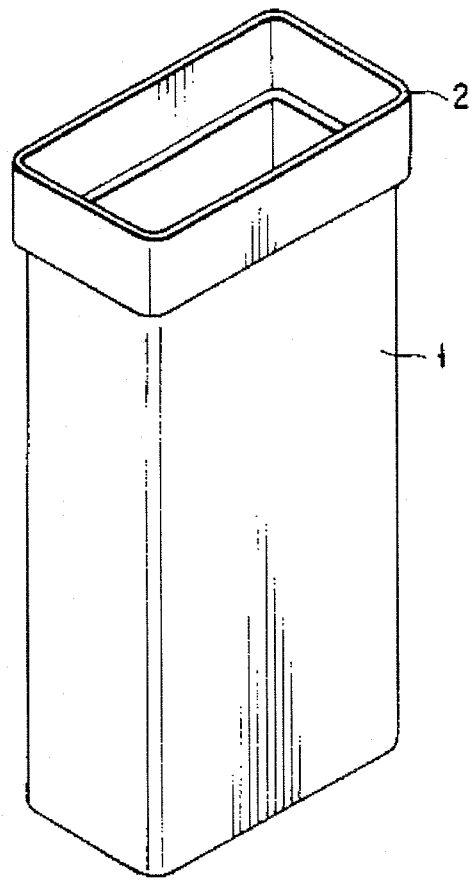
FIG. 2 is an oblique view showing the metal case included in the secondary cell shown in FIG. 1.

The present invention provides a rectangular nickel-metal hydride secondary cell, comprising a rectangular cylindrical metal case having a bottom; an electrode group housed in the metal case and constructed such that a nickel positive electrode and a hydrogen absorption alloy negative electrode are alternately superposed one upon the other with a separator interposed between the positive and negative electrodes; an alkali electrolyte contained in the metal case; a rectangular sealing plate mounted near the open end portion of the metal case; and an insulating sealing gasket formed of a synthetic resin and interposed in a compressed state between the inner wall near the open end of the metal case and the peripheral portion of the sealing plate; wherein the metal case comprises a folded portion formed by inwardly folding the open end portion of the metal case and an inwardly projecting stepped portion formed along the inner surface of the metal case below the folded portion, the sealing plate is fixed to the metal case with the insulating gasket interposed therebetween at the position between the folded portion and the stepped portion of the metal case, the folded portion at a corner portion of the open end portion of the metal case has an angle of 80° to 100°, and the folded portion at the side positioned between two adjacent corners of the open end portion of the metal case has an angle smaller than that of the corner portion.

In the secondary cell of the present invention, it is necessary for the folded portion in the corner portion of the open end of the metal case to have an angle of 80° to 100°. If the folding angle of the corner portion is less than 80°, the air-tightness is lowered. On the other hand, if the folding angle on the corner portion exceeds 100°, the metal case is deformed in the step of forming the folded portion. The folding angle in the corner portion of the open end portion noted above preferably falls within a range of between 80° and 95°.

The folding angle of the folded portion in the side interposed between two adjacent corner portions must be smaller than that at the corner portion and preferably falls within a range of between 45° and 90°. If the folding angle of the side is smaller than 45°, the air-tightness tends to be lowered. On the other hand, folding angle of the side exceeds 90°, it may be difficult to prevent the metal case from being deformed in the step of forming the folded portion.

The insulating sealing gasket is preferably made of a polyamide series resin such as nylon 6, 6 mixed with carbon black or graphite.

The rectangular nickel-metal hydride secondary cell according to the present invention produces a prominent effect. Specifically, the open end portion of the metal case, which is rectangular in cross section, is inwardly folded to form a folded portion, as described previously. What should be noted is that the folding angle in the corner portion of the folded portion is set to fall within a range of between 80° and 100° in the present invention. In addition, the folding angle in the side interposed between two corner portions is set to be smaller than that of the corner portion. The folding angles thus defined makes it possible to prevent the metal case from being deformed in the step of forming the folded portion. To be more specific, the metal case is prevented from bearing deformation such as deflection or strain without fail.

The present invention also provides a method of manufacturing a rectangular nickel-metal hydride secondary cell, comprising the steps of:

housing an electrode group and an alkali electrolyte in a rectangular cylindrical metal case having a bottom and a stepped portion formed along the inner surface of the metal case by enlarging the open end portion of the metal case, the electrode group being constructed such that a nickel positive electrode and a hydrogen absorption alloy negative electrode are superposed one upon the other with a separator interposed between the adjacent positive and negative electrodes;

mounting a rectangular cylindrical insulating gasket having a bottom and a rectangular sealing plate housed therein in advance on the stepped portion of the metal case, a rectangular hole being formed in the bottom of the insulating gasket;

reducing the diameter of the open end portion of the metal case to a value substantially equal to that of the main body portion of the metal case by inserting the open end portion of the metal case to a drawing mold so as to press inwards the rising wall of the insulating gasket, the mold having a rectangular hollow in the central portion and a tapered portion formed by outwardly enlarging the inner surface of the hollow in the lower portion of the mold;

abutting a curling mold against the open end portion of the metal case by dropping the curling mold to the metal case, so as to inwardly fold the open end portion of the metal case and, thus, to permit the sealing plate to be fixed under pressure to the metal case with the insulating gasket interposed therebetween, the curling mold having a rectangular hollow in the central portion, a rectangular recess formed in the bottom portion to communicate with the hollow and sized larger than the hollow, and a tapered portion formed in the inner surface in the lower end portion of the recess, the tapered portion having an angle of 0.5° to 10°; and raising the curling mold while holding downward the sealing plate with knock-out vertically movable within the hollow of the curling mold so as to detach the curling mold from the metal case.

In the method of the present invention, a curling mold having a tapered portion formed in the inner surface in the lower portion of the recess of the mold is used. In the present invention, it is necessary for the tapered portion to have an angle of 0.5° to 10°, as pointed out above. If the tapering angle is less than 5°, it is difficult to detach the curling mold from the metal case. On the other hand, if the tapering angle exceeds 10°, it is difficult to fold the open end portion of the metal case.

In order to diminish effectively the diameter in the open end portion of the metal case, it is desirable to form the tapered portion of the curling mold by outwardly expanding the inner surface in the lower end portion of the hollow by 1° to 5°.

It is also desirable to use a drawing mold and a curling mold meeting the relationship $r_1 > r_2$, where $r_1$ denotes the curvature in each corner portion of the hollow of the drawing mold, and $r_2$ represents the curvature in each corner portion of the recess of the curling mold.

The method of the present invention described above produces prominent effects as pointed out below:

1. The method of the present invention uses a curling mold having a rectangular hollow in the central portion, a rectangular recess formed in the bottom portion to communicate with the hollow and sized larger than the hollow, and a tapered portion formed in the inner surface in the lower end portion of the recess, the tapered portion having an angle of 0.5° to 10°. The curling mold of the particular construction is used in the curling step, making it possible to curl in a desired shape the open upper end portion of the metal case having the diameter diminished by the drawing mold. What should also be noted is that a tapered portion is formed in the inner surface in the lower end portion of the recess included in the curling mold, as described previously. When the curling mold is engaged with the open upper end portion of the metal case, the presence of the tapered portion permits occurring the space between the circumferential region below the open end portion of the metal case and the lower end portion of the recess included in the curling mold, with the result that the curling mold can be detached easily from the metal case after the curling process. It follows that it is possible to prevent the manufactured secondary cell from being lowered in the air-tightness because the sealing plate is prevented from falling down and the insulating gasket is prevented from being split.

2. The method of the present invention uses a drawing mold and a curling mold meeting the relationship $r_1 > r_2$, where $r_1$ denotes the curvature in each corner portion of the hollow of the drawing mold, and $r_2$ represents the curvature in each corner portion of the recess of the curling mold. Since the curvature $r_1$ in each corner portion of the hollow of the drawing mold is set larger than the curvature $r_2$ in each corner portion of the recess of the curling mold, the curvature in each corner portion in the open end portion of the metal case after the diameter reduction is made equal to the curvature $r_1$ noted above. It follows that, when the curling mold is engaged with the open end portion of the metal case for the curling treatment, it is possible to suppress the force acting on the corner portions in the open end portion of the metal case. As a result, it is possible to prevent the metal plating layer from peeling off the metal case and to prevent the metal case from being damaged, and also the curling mold can be detached easily from the metal case. Therefore, the air-tightness and reliability of the manufactured secondary cell can be enhanced.

The present invention also provides a method of manufacturing a rectangular nickel-metal hydride secondary cell, comprising the steps of:

housing an electrode group and an alkali electrolyte in a rectangular cylindrical metal case having a bottom and a stepped portion along the inner surface of the metal case formed by enlarging the open end portion of the metal case, the electrode group being constructed such that a nickel positive electrode and a hydrogen absorption alloy negative electrode are superposed one upon the other with a separator interposed between the adjacent positive and negative electrodes;

mounting a rectangular cylindrical insulating gasket having a bottom and a rectangular sealing plate housed therein in advance on the stepped portion of the metal case, a rectangular hole being formed in the bottom of the insulating gasket, and the sealing plate having longer side surfaces which are curved outward;

reducing the diameter of the open end portion of the metal case to a value substantially equal to that of the main body portion of the metal case by using a drawing mold so as to press inwards the rising wall of the insulating gasket, the mold having a rectangular hollow in the central portion and a tapered portion formed by outwardly enlarging the inner surface of the hollow in the lower portion of the mold; and abutting a curling mold against the open end portion of the metal case, so as to inwardly fold the open end portion of the metal case to form a folded portion and, thus, to permit the sealing plate to be fixed under pressure to the metal case with the insulating gasket interposed therebetween, the curling mold having a rectangular hollow in the central portion, a rectangular recess formed in the bottom portion to communicate with the hollow and sized larger than the hollow, and a tapered portion formed in the inner surface in the lower end portion of the recess;

wherein the hollow of the drawing mold has outwardly curved inner surfaces in the regions corresponding to the curved side surfaces of the sealing plate, and the recess included in the curling mold has outwardly curved inner surfaces in the regions corresponding to the curved side surfaces of the sealing plate.

In the method of the present invention described above, it is desirable to have the hollow of the drawing mold shaped such that the width in the central portion defined by the outwardly curved inner surfaces is greater by at least 0.5% than that in the end portion. It is also desirable to have the recess included in the curling mold shaped such that the width in the central portion defined by the curved inner surfaces is greater by at least 0.5% than that in the end portion. When each of the drawing mold and the curling mold used in the method of the present invention is shaped as pointed out above, it is possible to obtain a secondary cell exhibiting an improved air-tightness.

The particular method of the present invention described above permits producing a prominent effect. To reiterate, the diameter in the open end portion of the metal case is diminished in the present invention by using a drawing mold having a hollow shaped in a particular fashion. Specifically, the longer inner surfaces of the drawing mold defining the hollow, which corresponds to outwardly curved side surfaces of the sealing plate, are bent to form a convex configuration. Further, the open end portion of the metal case is inwardly folded by using a curling mold having a rectangular recess shaped in a particular fashion. Specifically, the longer inner surfaces of the curling mold defining the rectangular recess, which corresponds to the outwardly curved side surfaces of the sealing plate, are bent to form a convex configuration. Use of the particular curling mold makes it possible to fold inwardly the open upper end portion of the metal case to conform with the outwardly curved side surfaces of the sealing plate. It follows that it is possible to prevent the insulating gasket interposed between the folded portion of the metal case and curved side surfaces of the sealing plate from being compressed excessively, making it possible to prevent the sealing plate from being deformed. Since the sealing plate is prevented from being deformed, it is possible to prevent the open end portion of the metal case, particularly the longer side of the open end portion, from being bent by the gas pressure generated within the metal case in the event of, for example, short-circuiting or over-charging. In other words, the secondary cell of the present invention permits maintaining a high air-tightness even in the event of an increase in the internal pressure.

Further, the present invention provides a method of manufacturing a rectangular nickel-metal hydride secondary cell, comprising the steps of:

applying at least one cycle of charging-discharging cycles to a rectangular nickel-metal hydride secondary cell including an electrode group and an alkali electrolyte, the electrode group being constructed such that a nickel positive electrode and a hydrogen absorption alloy negative electrode are superposed one upon the other with a separator interposed between the adjacent positive and negative electrodes;

permitting the secondary cell with a small residual capacity to stand for aging; and fully charging the secondary cell after the aging step, followed by discharging the secondary cell so as to perform a capacity screening inspection of the secondary cell.

The aging treatment included in the method of the present invention described above is intended to activate sufficiently the hydrogen absorption alloy negative electrode. It is desirable to carry out the aging treatment at a temperature falling with a range of between 25° C. and 60° C. If the temperature for the aging treatment is lower than 25° C., it is difficult in some cases to activate the negative electrode. On the other hand, if the aging treatment is carried out at temperatures exceeding 60° C., the electrode group housed in the secondary cell tends to be deteriorated.

In the method described above, the expression "small residual capacity" noted above represents the capacity obtained by discharging a secondary cell with a discharge rate of at least 0.2 C until the cell voltage reaches a predetermined voltage, so as to arrive at a level not higher than 20% of the total discharge capacity.

The method of the present invention described above produces a prominent effect. To reiterate, at least one cycle of charging-discharging cycles is applied in the method of the present invention to a rectangular nickel-metal hydride secondary cell including a positive electrode containing nickel hydroxide as an active substance, a negative electrode containing a hydrogen absorption alloy as an active substance, and an alkali electrolyte, followed by permitting the secondary cell with a small residual capacity to stand for aging. The particular treatment makes it possible to sufficiently activate the negative electrode and, at the same time, to increase the capacity of the negative electrode. As a result, it is possible to improve sufficiently the discharge voltage and the discharge capacity. This makes it possible to determine appropriately the quality of the cell itself in the step of screening the capacity after the aging treatment regardless of the degree of activation of the negative electrode included in the cell. It follows that the number of unsatisfactory cells is decreased, leading to an improvement in the yield. What should also be noted is that, when a paired cell is prepared by using the secondary cells screened by the test noted above, the resultant paired cells are rendered low in variation of the discharge capacity, which is derived from the individual secondary cells.

Some examples of the present invention are described below.

EXAMPLE 1

A rectangular nickel-metal hydride secondary cell in this example is constructed as shown in FIGS. 1 to 5.

As shown in FIGS. 1 and 2, a metal case 1, which also acts as a negative electrode, is in the form of a cylinder having a bottom and shaped rectangular in cross section. The metal case 1 has a rectangular open upper end 2. The peripheral portion of the open end 2 of the metal case 1 is folded inward to form a rectangular folded portion 3.

Figure 3:
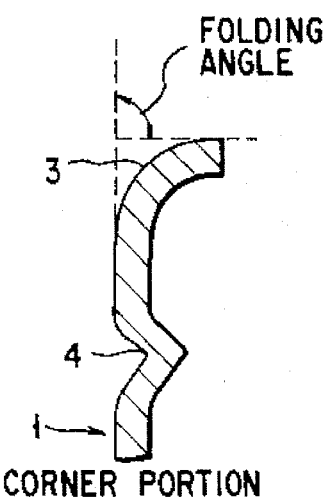
FIG. 3 is a cross sectional view showing a corner portion in the open end of the metal case included in the secondary cell shown in FIG. 1.
Figure 4:
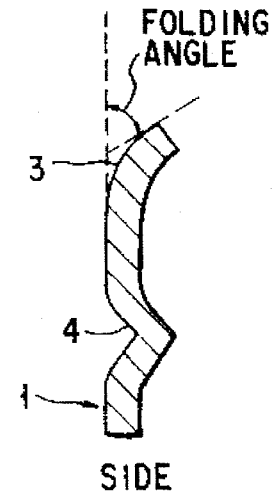
FIG. 4 is a cross sectional view showing a side portion positioned between two adjacent corner portions in the open end of the metal case included in the secondary cell shown in FIG. 1.

As shown in FIGS. 3 and 4, the folded portion 3 has an angle of 88° at the corner portion and an angle of 63° at the side interposed between two adjacent corner portions. An inwardly projecting stepped portion 4 is formed below the folded portion 3 of the metal case 1. An electrode group 5 is constructed such that a hydrogen absorption alloy negative electrode 6 and a positive electrode 8 containing nickel hydroxide as an active substance wrapped in a bag-like separator 7 are alternately superposed one upon the other. The electrode group 5 is housed in the metal case 1 such that the negative electrode 6 is brought into contact with the inner surface of the metal case 1.

Also contained in the metal case 1 is an alkali electrolyte formed of a mixed solution consisting of 7N-KOH and 1N-LiOH. A sealing lid group 9, which also performs the explosion-preventing function and acts as a terminal of the positive electrode, is positioned in a region surrounded within the metal case 1 by the folded portion 3 and the stepped portion 4. The sealing lid group 9 comprises a rectangular sealing plate 11 having a gas releasing hole 10 formed in the central portion, an elastic valve body 12 formed of, for example, a synthetic rubber, and a hat-shaped terminal cap 13 having a gas releasing hole (not shown) formed therein. The elastic valve body 12 is disposed on the sealing plate 11 to close the gas releasing hole 10. The terminal cap 13 is welded to the sealing plate 11 in a manner to surround the elastic valve body 12.

An insulating gasket 14, which is in the form of a cylinder having a bottom, shaped rectangular in its cross section, and having a rectangular hole formed in the bottom, is interposed between the inner surface near the open end of the metal case 1 and the side surface of the sealing plate 11. The sealing plate 11 of the sealing lid group 9 is hermetically fixed to the metal case 1. The insulating gasket 14 is formed of, for example, nylon 6, 6 containing carbon black.

Figure 5:
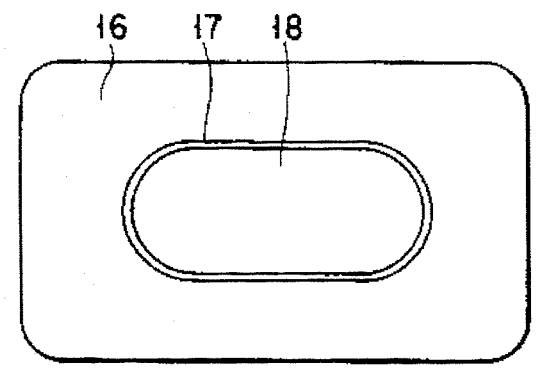
FIG. 5 is a plan view showing a partial portion of the secondary cell shown in FIG. 1.

A positive electrode lead 15 is connected at one end to the nickel positive electrode 8 and, at the other end, to the lower surface of the sealing plate 11. An insulating plate 16 having a rectangular hole 17 formed in the central portion is disposed to extend over a flange portion 19 of the terminal cap 13 and the folded portion 3 of the metal case 1 such that a projecting portion 18 of the terminal cap 3 is engaged with the rectangular hole 17 of the insulating plate 16, as shown in FIG. 5. An outer tube 20, which is formed of a heat-shrinkable resin, is used to cover the outer surface in the main body portion of the metal case 1, the outer peripheral portion in the bottom of the metal case 1 and the peripheral portion of the insulating plate 16, with the result that the insulating plate 16 is fixed to the folded portion 3 of the metal case 1 and the flange portion 19 of the terminal cap 13.

When a gas is generated within the metal case 1 by, for example, over-charging or short-circuiting in the secondary cell constructed as shown in FIGS. 1 to 5, the gas pressure is applied to the elastic valve body 12 made of an elastic material via the gas releasing hole 10 formed in the sealing plate 11. In this case, the elastic valve body 12 is elastically deformed to provide a clearance between the elastic valve body 12 and the sealing plate 11. It follows that the gas generated within the metal case 1 is released to the outside through the clearance noted above and the gas releasing hole (not shown) formed in the terminal cap 13, with the result that the secondary cell is prevented from being broken.

To reiterate, the secondary cell of the construction described above comprises the folded portion 3 formed by folding the open end portion 2 of the metal case 1. It should be noted that the folding angle of the folded portion 3 in the corner portion is set at 88°, as shown in FIG. 3. On the other hand, the folding angle of the folded portion 3 in the side interposed between two adjacent corner portions is set at 63°, which is smaller than the folding angle in the corner portion, as shown in FIG. 4. The particular folding angles defined in the present invention make it possible to maintain a high air-tightness of the cell and to prevent the metal case 1 from bearing deflection or strain without fail.

In Example 1 described above, it is desirable for the folding length of the folded portion 3 in the corner portion of the open end 2 of the metal case 1 to be greater than the thickness of the metal case 1. It is also desirable to determine the curvature radius Rc at the corner portion in the folded portion 3 of the metal case 1 to meet formula (1) given below:

$$1.5\ t \leq Rc \leq 4\ t \quad (1)$$

where "t" denotes the thickness of metal case 1.

The particular construction meeting the requirements described above makes it possible to prevent the metal case 1 from being deformed when the folded portion 3 is formed and to improve the air-tightness of the secondary cell.

In Example 1, it is also desirable for the curvature radius Rb in the corner portion of the bottom of the metal case 1 to meet formula (2) given below:

$$Rb \leq Rc \quad (2)$$

In other words, the curvature radius Rb noted above should not be larger than the curvature radius Rc at the corner portion in the folded portion 3 of the metal case 1.

Where all the requirements (1) and (2) given above are satisfied together, the metal case 1 is allowed to exhibit an increased mechanical strength at the bottom portion, and at the same time, the metal case 1 is prevented from being deformed in the step of folding the open end portion 2 of the metal case 1 without fail. The values of t, Rc and Rb noted above are desirably set at, for example, 0.4 mm, 1 mm and 0.8 mm, respectively.

In the present invention, it is also preferable to determine appropriately the amount of the alkali electrolyte contained in the metal case 1. To be more specific, the amount of the electrolyte is preferably 90% by volume or less based on the effective free space of the metal case 1, which is determined by subtracting the effective volumes excluding the porosities of the nickel positive electrode 8, the hydrogen absorption alloy negative electrode 6 and the separator 7 from the volume occupied by the electrode group 5, i.e., A×B, where A denotes the length of the electrode group 5 and B represents the bottom area of the metal case 1. It is also preferable for the amount of the alkali electrolyte to be at least 1.7 ml/Ah of the cell capacity. Where the amount of the electrolyte contained in the metal case 1 is determined to meet these conditions, the oxygen gas generated from the positive electrode 8 in the charging step can be promptly absorbed by the surface of the negative electrode 6, as seen from samples A to D shown in Table 1 given below. It follows that it is possible to suppress the increase in the internal pressure of the secondary cell and to ensure satisfactory charging-discharging characteristics.

TABLE 1

|  | A | B | C | D |
| --- | --- | --- | --- | --- |
| Electrolyte amount (vol %) based on effective free space | 80 | 85 | 90 | 95 |
| Electrolyte amount (ml)/Ah of cell capacity | 1.7 | 1.85 | 2.00 | 2.10 |
| Evaluation |  |  |  |  |
| Max. cell inner pressure at 150% charging step at 0.5 C | 2.1 | 3.5 | 5.2 | 13 |
| The number of charge-discharge cycle reaching 60% of initial discharge capacity | 350 | 440 | 500 | 85 |

As described previously, the insulating gasket 14 included in the secondary cell of Example 1 is formed of nylon 6, 6 containing carbon black. What should be noted is that the carbon black provides crystal nuclei in the step of preparing the insulating gasket 14, leading to an improved crystallinity of the gasket 14. It follows that the insulating gasket 14 is allowed to exhibit improvements in compression repulsivity (compression creep characteristics), weatherability and oxidation resistance, with the result that the air-tightness of the secondary cell can be further improved.

A comparative experiment was conducted in an attempt to look into the effect produced by the carbon black addition to nylon 6, 6 in preparation of the insulating gasket. Specifically, prepared was a secondary cell A provided with an insulating gasket formed of nylon 6, 6 containing 0.2% by weight of carbon black. Also prepared was a secondary cell B provided with an insulating gasket formed of nylon 6, 6 alone. These two secondary cells A and B were charged at 0.2 C under a temperature cycle ranging between −10° C.

and +65° C. Many samples of the charged secondary cells A and B were left to stand, followed by counting with Mil-Std-202F the number of cells in which the electrolyte leakage was found so as to obtain a leakage occurrence rate. FIG. 6 shows the results. As seen from the experimental data shown in FIG. 6, the secondary cell A provided with an insulating gasket formed of nylon 6, 6 containing carbon black was found to markedly suppress the leakage occurrence rate, compared with the secondary cell B provided with an insulating gasket formed of nylon 6, 6 alone. In other words, the insulating gasket formed of nylon 6, 6 containing carbon black permits markedly improving the air-tightness of the secondary cell.

In the secondary cell in Example 1, it is desirable to set the compression ratio applied to that portion of the insulating gasket 14 which is interposed between the side of the open end portion 2 of the metal case 1 and the sealing plate 11 at 15 to 40%. In addition, the compression ratio noted above is desirably higher than the compression ratio applied to that portion of the insulating gasket 14 which is interposed between the corner portion in the open end portion 2 of the metal case 1 and the sealing plate 11.

The compression ratio noted above is determined by formula (3) given below:

$$\text{Compression ratio } (\%) = (tb - ta)/tb \times 100 \quad (3)$$

where tb denotes the thickness of the rising portion of the insulating gasket 14 before the compression, and ta represents the thickness of the rising portion of the insulating gasket 14 after the compression.

Where the insulating gasket 14 is compressed under the condition specified above, it is possible to enable the insulating gasket 14 to retain a repulsive elastic force large enough to overcome the bending force when the side portion in the vicinity of the open end portion of the metal case 1 is expanded outward by the increase in the internal pressure of the secondary cell. It follows that the air-tightness of the secondary cell can be further improved.

In the secondary cell in Example 1, it is desirable to form a rectangular frame-shaped eaves portion 14b for provisionally fixing the sealing plate 11 to the inner surface of the rising portion 14a of the insulating gasket 14, as shown in FIG. 7. Where the insulating gasket is provided with such an eaves portion, it is desirable not to form the eaves portion in the corner portion or to make a projecting length of the eaves portion positioned in the corner portion shorter than that of the eaves portion positioned in the side portion interposed between two adjacent corner portions.

To be more specific, when an insulating gasket having an eaves portion formed at the corner portion is formed by an injection molding, followed by detaching the mold from the molded insulating gasket, the eaves portion positioned in the corner portion is not as likely as to be expanded outward than the eaves positioned in the side portion. It follows that it is difficult in some cases to detach the mold from the eaves portion positioned in the corner portion. It should also be noted that, where the sealing plate is inserted into the insulating gasket having an eaves portion positioned in the corner portion, it is necessary to allow the sealing plate to push the eaves portion positioned in the corner portion because the eaves portion positioned in the corner portion is not as likely as to be expanded outward than the eaves positioned in the side potion. As a result, the eaves portion positioned in the corner portion is scratched off by the sealing plate and, thus, the sealing plate is disposed within the insulating gasket, with the eaves portion, which is scratched off by the sealing plate, held between the sealing plate and the insulating gasket. It follows that the bonding strength between the insulating gasket and the sealing plate is lowered, leading to reduction in the air-tightness of the secondary cell.

In the insulating gasket of the particular shape described above, it is desirable to form an eaves portion for provisionally fixing the longer side of the sealing plate without forming an eaves portion for provisionally fixing the shorter side of the sealing plate. Alternatively, it is desirable to make the a projecting length of the eaves portion for provisionally fixing the shorter side of the sealing plate shorter than that of the eaves portion for provisionally fixing the longer side of the sealing plate. The insulating gasket of the particular construction permits further facilitating the release of the mold and also permits facilitating the insertion of the sealing plate into the insulating gasket.

The mold release capability and the insertion capability of a sealing plate into an insulating gasket were examined in respect of insulating gasket samples A, B and C provided with eaves portions sized as shown in Table 2. As seen from Table 2, an eaves portion for provisionally fixing the corner portion of the sealing plate was not formed in each of samples A and B. On the other hand, sample C was provided with eaves portions for provisionally supporting the corner portion, the shorter side, and the longer side of the sealing plate. The results of the examination are also shown in Table 2.

TABLE 2

|  |  | A | B | C |
|---|---|---|---|---|
| Projecting length of eaves portion of insulating gasket (mm) | Longer side | 0.07 | 0.1 | 0.05 |
|  | Shorter side | 0.05 | 0 | 0.05 |
|  | Corner | 0 | 0 | 0.05 |
| Evaluation |  |  |  |  |
| Mold Release Capability |  | Good | Good | Somewhat Good |
| Insertion Capability |  | Good | Good | Somewhat Good |

Table 2 shows that, in the insulating gasket sample A, an eaves portion was not formed in the corner portion, and a projecting length of the eaves portion for provisionally fixing the shorter side of the sealing plate was smaller than that of the eaves portion for provisionally fixing the longer side of the sealing portion. On the other hand, the insulating gasket sample B was provided with only an eaves portion for provisionally fixing the longer side of the sealing plate alone. As shown in Table 2, each of these insulating gasket samples A and B was found to be satisfactory in each of the mold release capability and the insertion capability of the sealing plate into the insulating gasket. Naturally, the secondary cell provided with an insulating gasket constructed as in any of the insulating gasket samples A and B is enabled to exhibit an improved air-tightness.

It is desirable to prepare the insulating gasket 14 included in the secondary cell in Example 1 by means of injection molding using a mold provided with at least two injection gates. When the injection molding mold used for preparing the insulating gasket 14 is provided with two injection gates positioned in symmetry with respect to the center of the molding, i.e., the insulating gasket to be obtained, the resultant insulating gasket 14 is rendered uniform in the resin density over the entire region, compared with the case when the resin is injected into the mold cavity through only one injection gate for preparation of the insulating gasket. To be more specific, a mold provided with two injection gates permits suppressing the weld line denoting a difference in the resin density of the resultant insulating gasket 14, with the result that the insulating gasket 14 is prevented from being cracked.

Further, it is desirable to inject the resin material into the mold cavity through a gate positioned in the bottom portion of the injection molding mold in preparation of the insulating gasket 14. It should be noted that the resin in that portion of the insulating gasket 14 which corresponds to the gate region noted above differs in density and crystallinity from the other portion, with the result that cracking is likely to take place in the insulating gasket 14 in the step of sealing the metal case 1. In order to overcome the difficulty, it is desirable to inject the resin material through a gate positioned in the bottom portion of the mold in preparing the insulating gasket 14. What should be noted is that, in this case, force is not exerted in the step of sealing the metal case 1 on that portion of the resultant insulating gasket 14 which corresponds to the gate region positioned in the bottom of the injection molding mold. In other words, the particular molding technique described above permits improving the mechanical strength in the rising portion, to which the greatest force is exerted in the sealing step, of the insulating gasket 14. It follows that it is possible to further improve the air-tightness of the secondary cell.

Figure 8:
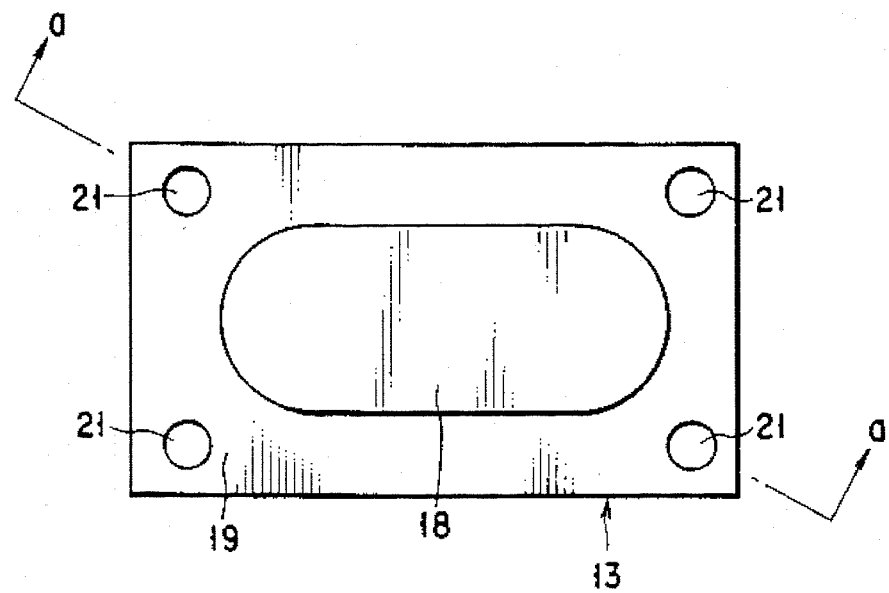
FIG. 8 is a plan view showing a hat-shaped terminal cap used in a rectangular nickel-metal hydride secondary cell according to another embodiment of the present invention.
Figure 9:
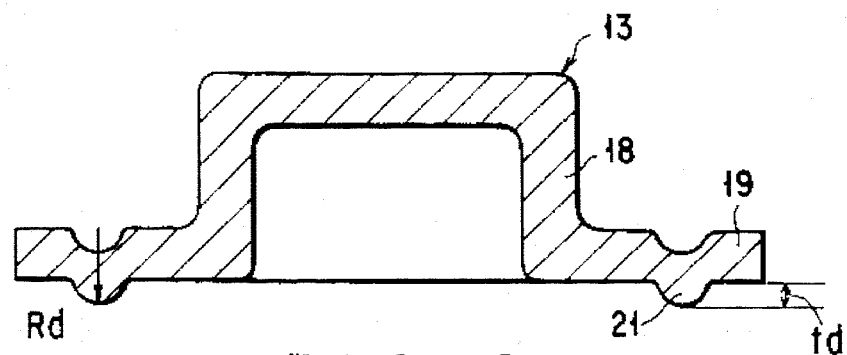
FIG. 9 is a cross sectional view along line a—a shown in FIG. 8.

The terminal cap 13 included in the secondary cell of Example 1 comprises the flange portion 19 as described previously. It is desirable to form a plurality of projections for resistance welding on the lower surface of the flange portion 19. These projections are preferably positioned in symmetry with respect to the center of the terminal cap 13. To be more specific, it is desirable to form, for example, two or four projections in the particular fashion. More preferably, it is desirable to form four projections 21 in the four corner portions in the lower surface of the flange portion 19 of the terminal cap 13, as shown in FIGS. 8 and 9. As apparent from the drawings, these four projections 21 are positioned in symmetry with respect to the center of the terminal cap 13. The terminal cap 13 constructed as shown in FIGS. 8 and 9 permits increasing the mounting strength of the terminal cap 13 against the sealing plate 11 and also permits decreasing the nonuniformity in the size of the fused portion of the projection 21 in the welding step against the sealing plate 11.

As shown in FIG. 9, it is desirable for the projecting amount td of the projection 21 to be 0.5 to 2 times as much as the thickness of the terminal cap 13, and for the curvature radius Rd of the projection 21 to be 1.5 to 2.4 times as much as the thickness of the terminal cap 13.

It is desirable for the elastic valve body 12 included in the secondary cell in Example 1 to be formed of a material having a tensile strength of at least 100 kg/cm$^2$ and a tensile strength deterioration rate not higher than 2% in the ozone resistance deterioration test in which the sample is left to stand for 72 hours under an atmosphere of 40° C. having an ozone concentration of 50 ppm. The material meeting the particular requirements includes, for example, an ethylene-propylene-nonconjugated diene compound terpolymer (EPDM) and an ethylene-propylene copolymer.

Figure 10:
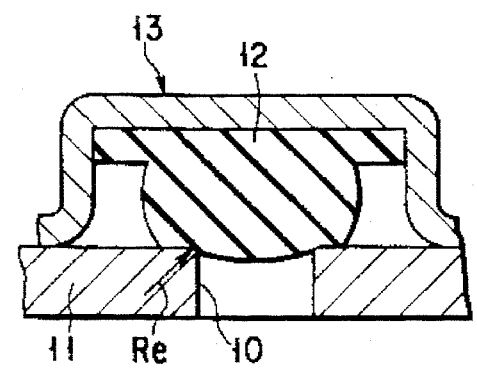
FIG. 10 is a cross sectional view showing a partial portion of a rectangular nickel-metal hydride secondary cell according to another embodiment of the present invention.

As described previously, the sealing plate 11 included in the secondary cell in Example 1 is provided with the gas releasing hole 10. As shown in FIG. 10, it is desirable for the curvature radius Re in the corner portion of the upper surface of the sealing plate 11 defining the gas releasing hole 10 to be at least 0.05 mm. In this case, the corner portion of the gas releasing hole 10 is rendered moderate, with the result that the use of the sealing plate 11 provided with the particular gas releasing hole 10 makes it possible to prevent the elastic valve body 12 from being broken when the elastic valve body 12 is deteriorated. To be more specific, the elastic valve body 12 is deteriorated when the elastic valve body 12 is moved up and down within the free space defined between the terminal cap 13 and the sealing plate 11 by the pressure of the gas generated by the over-charging state over a long period of time. It follows that, if the curvature radius Re of the gas releasing hole 10 is smaller than 0.05 mm, the corner portion of the gas releasing hole 10 is rendered too sharp to prevent the deteriorated elastic valve body from being broken by the corner portion in question.

It is desirable to form the projection 18 of the terminal cap 13 in a shape substantially conforming with the rectangular hole 17 formed in the insulating plate 16 as shown in FIG. 5. When the projection 18 of the terminal cap 13 is shaped in this particular fashion, it is possible to guide the insulating plate 16 naturally into an appropriate position when the insulating plate 16 is engaged with the projection 18 of the terminal cap 13. It should also be noted that the insulating plate 16 is fixed to the upper surface of the terminal cap 13. It follows that the projection 18 of the particular shape permits suppressing inconveniences such as detachment of the insulating plate 16 from the terminal cap 13 when the insulating plate 16 is rotated, leading to an improved reliability and a high productivity of the secondary cell.

EXAMPLE 2

Figure 11A:
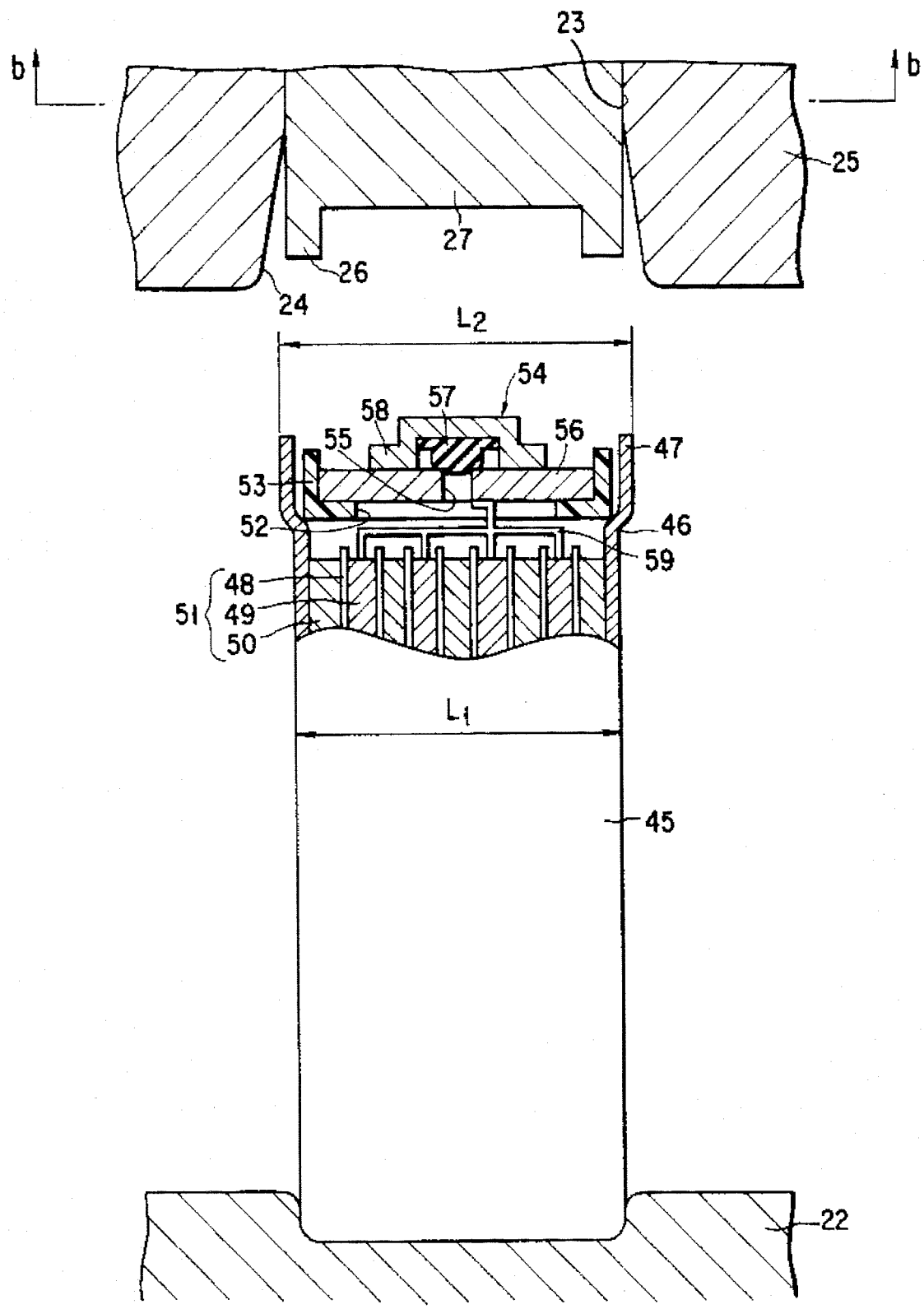
Figure 11B:
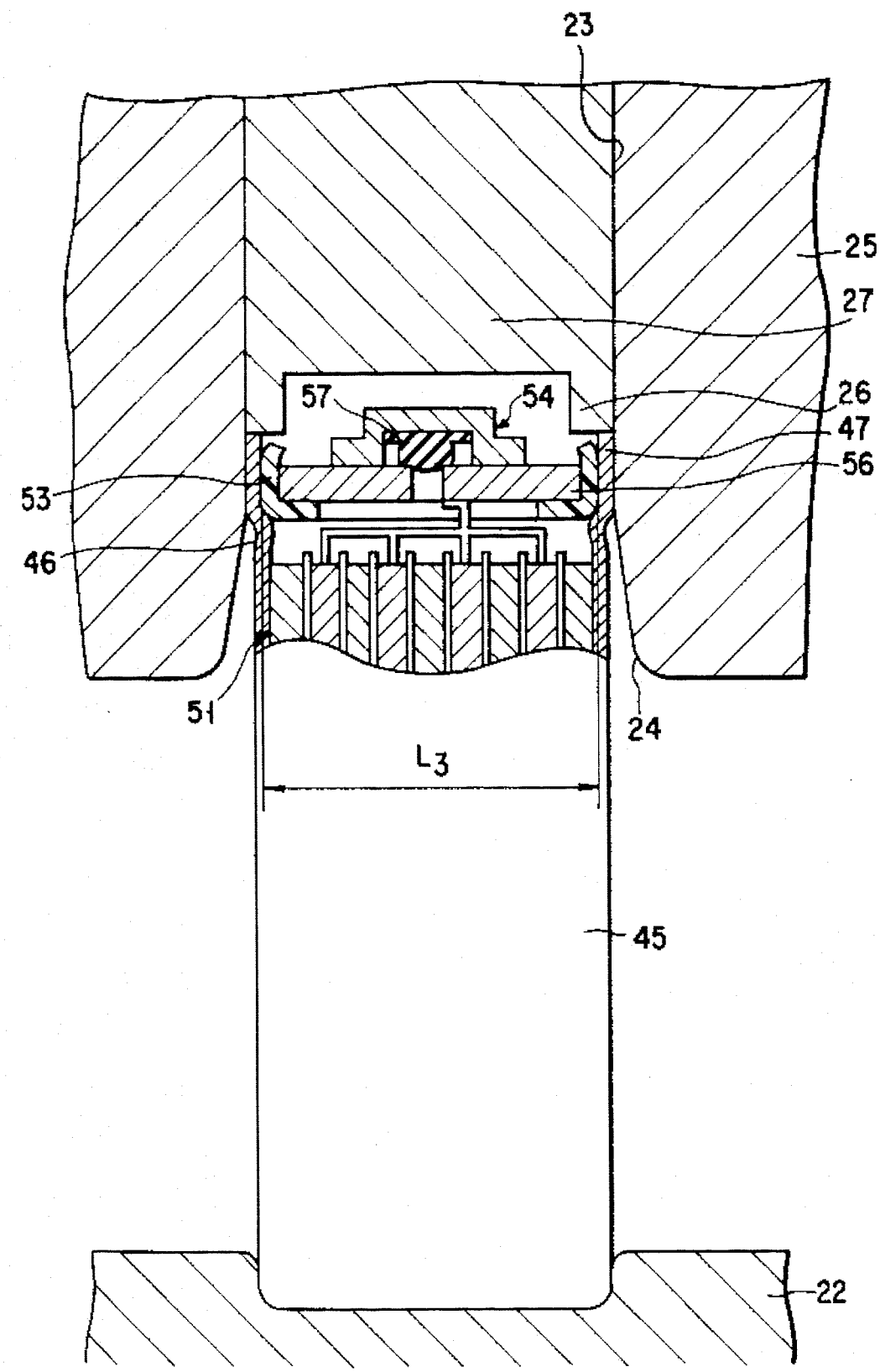

FIGS. 11A to 11I collectively show the drawing mold and the curling mold used in Example 2. As shown in FIGS. 11A and 11B, a metal case, which is described later, is disposed on a lower mold 22. A first drawing mold 25 movable in a vertical direction is arranged above the lower mold 22. The first drawing mold 25 comprises a hollow 23, which is rectangular in cross section, and a tapered portion 24 formed by outwardly expanding by 5° the inner surface in the lower portion of the hollow 23. A knock-out 27 having a rectangular frame-like projection 26 formed in the lower portion thereof is vertically movable within the hollow 23. The curvature radius $r_1$ in the corner portion of the hollow 23 of the first drawing mold 25, which is shown in FIG. 12, is 0.81 mm in Example 2.

Figure 11D:
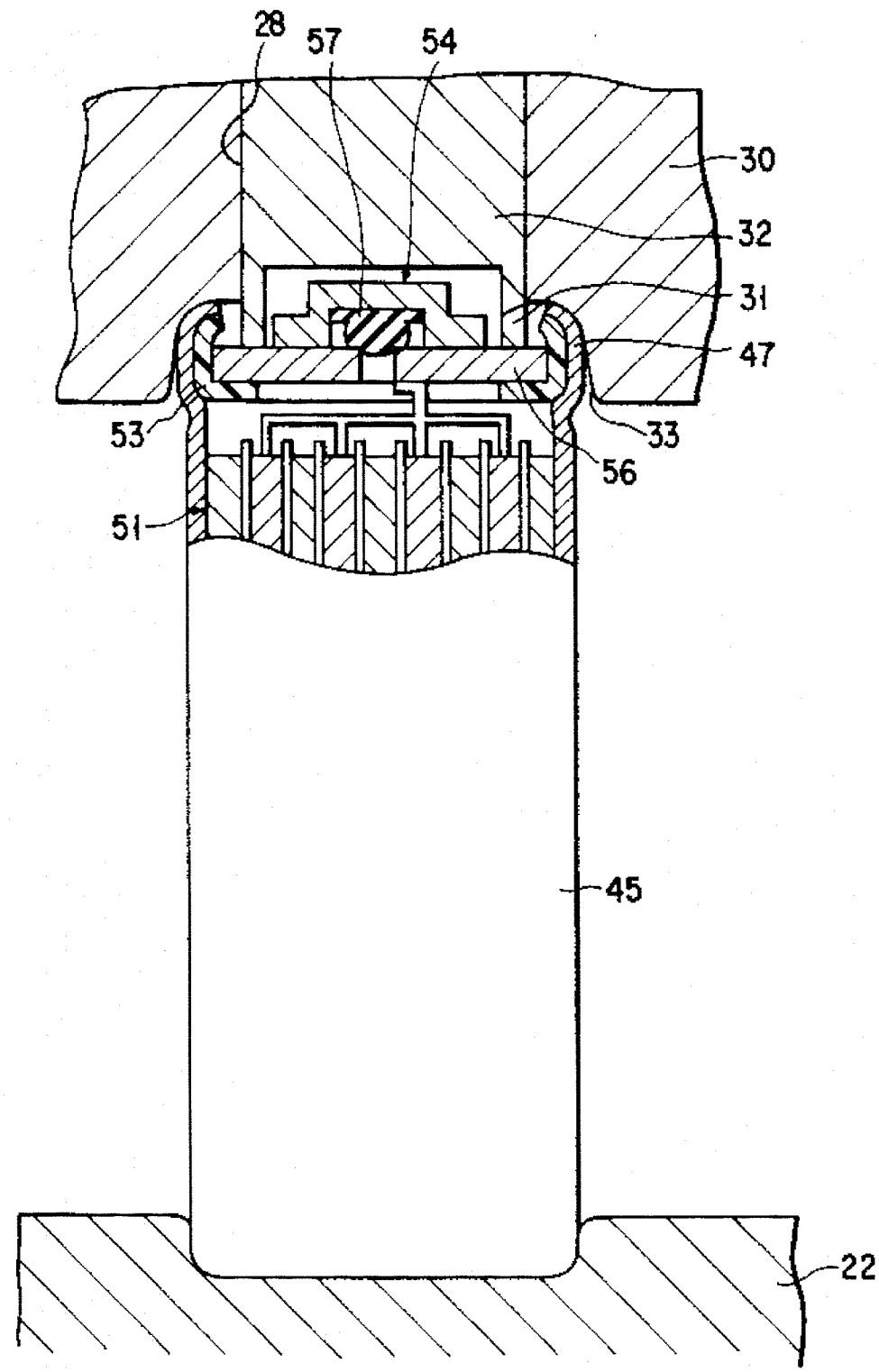

As shown in FIGS. 11C and 11D, a first curling mold 30 is arranged above the lower mold 22. The first curling mold 30 comprises a hollow 28 which is rectangular in cross section, and a rectangular recess 29 formed in the bottom portion in a manner to communicate with the hollow 28 and sized larger than the hollow 28. A knock-out 32 having a rectangular frame-like projection 31 formed in the periphery of the bottom portion is vertically movable within the hollow 28 and the recess 29. Each corner portion of the recess 29 has a curvature radius $r_2$, which is shown in FIG. 13, of 0.79 mm. As shown in FIG. 14, a tapered portion 33 having a tapering angle of 2° is formed in the inner surface in the lower end portion of the recess 29.

Figure 11E:
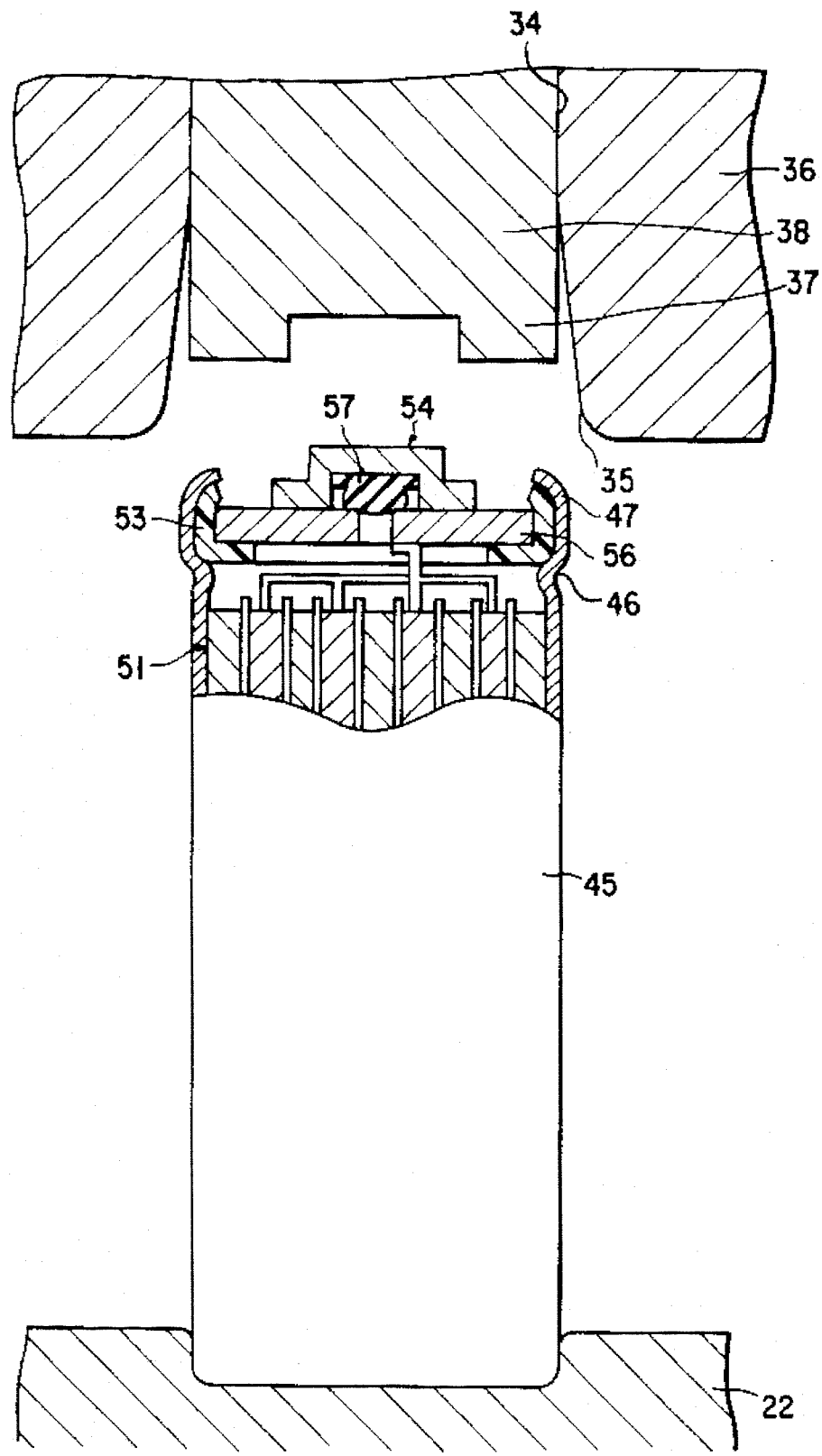
Figure 11F:
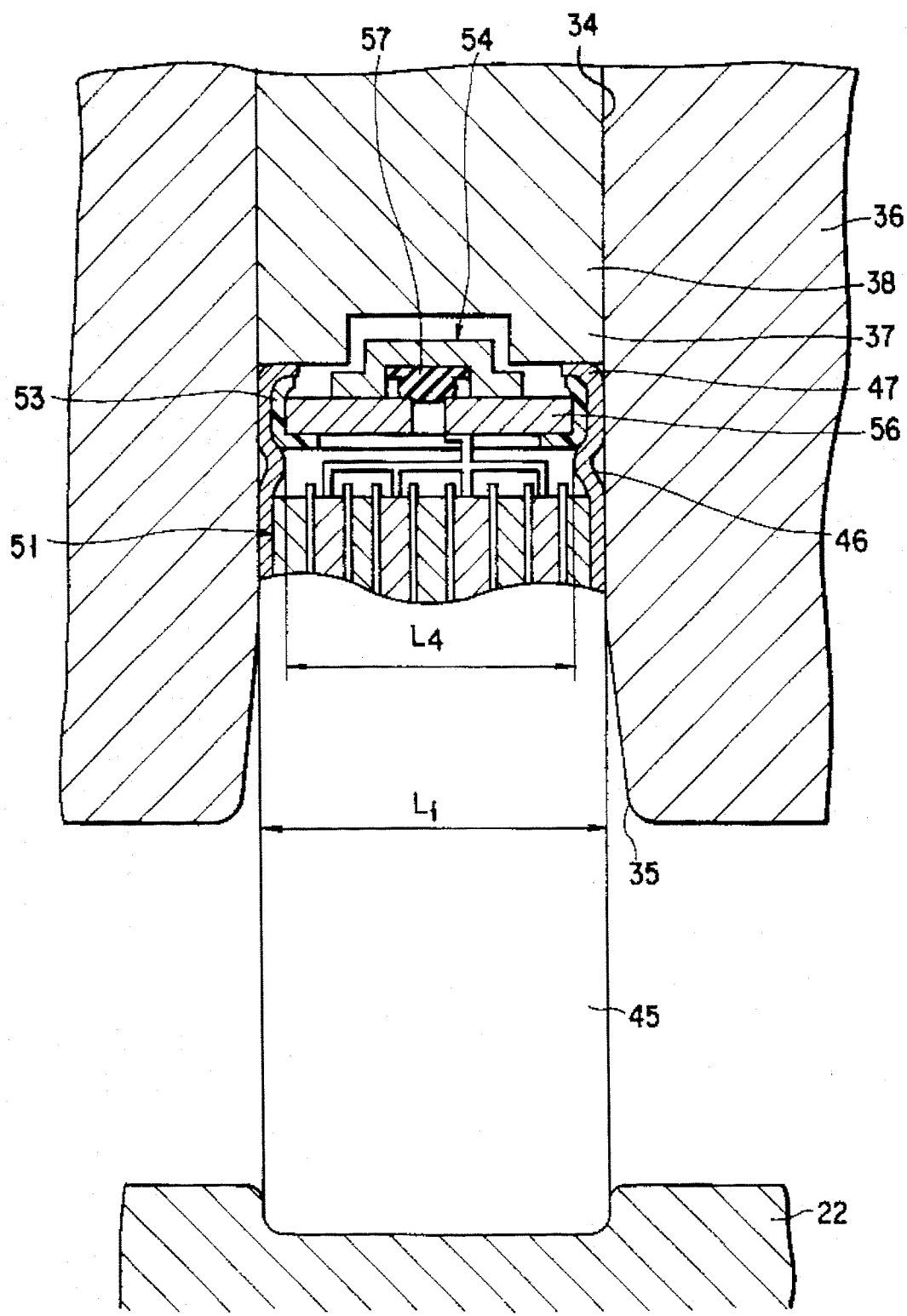

As shown in FIGS. 11E and 11F, a second drawing mold 36, which is movable in a vertical direction, is arranged above the lower mold 22. The second drawing mold 36 comprises a central hollow 34, which is rectangular in cross section, and a tapered portion 35 formed by outwardly expanding by 4° the lower end portion of the hollow 34. A knock-out 38 having a rectangular frame-like projection 37 formed in the periphery of the lower end portion is vertically movable within the hollow 34. It should be noted that each corner of the hollow 34 has a curvature radius of 0.81 mm.

Figure 11G:
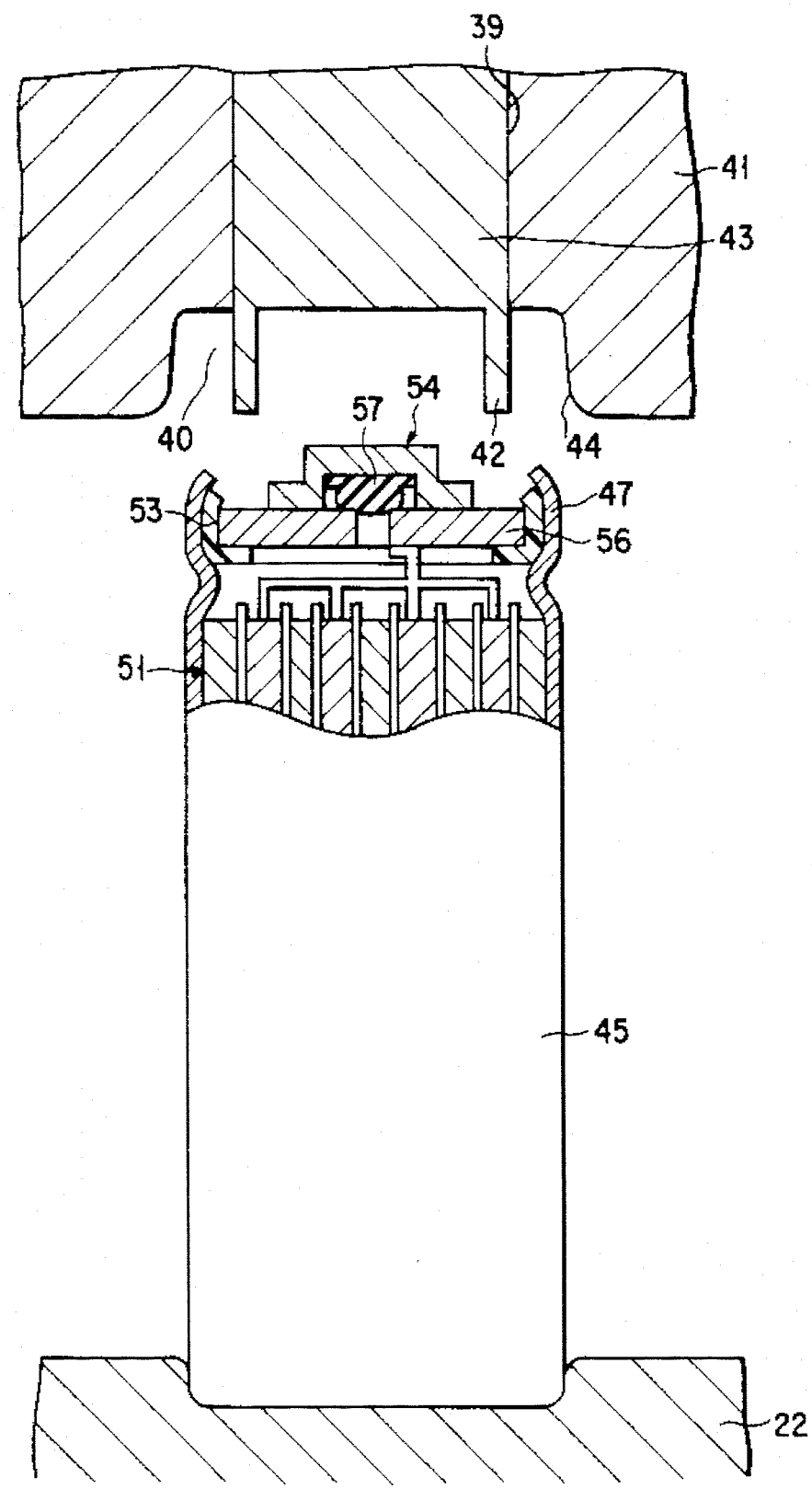
Figure 11H:
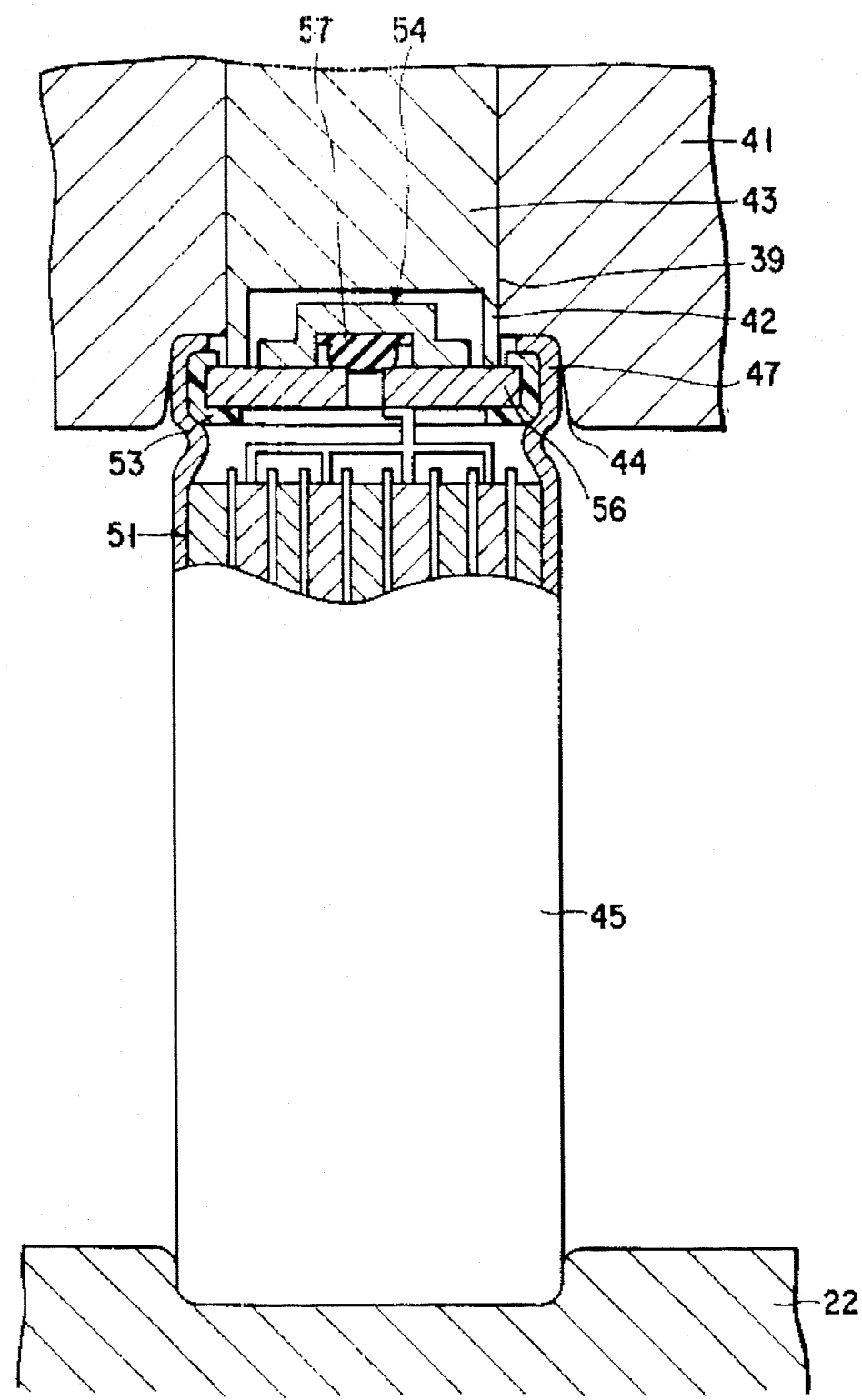
Figure 111:
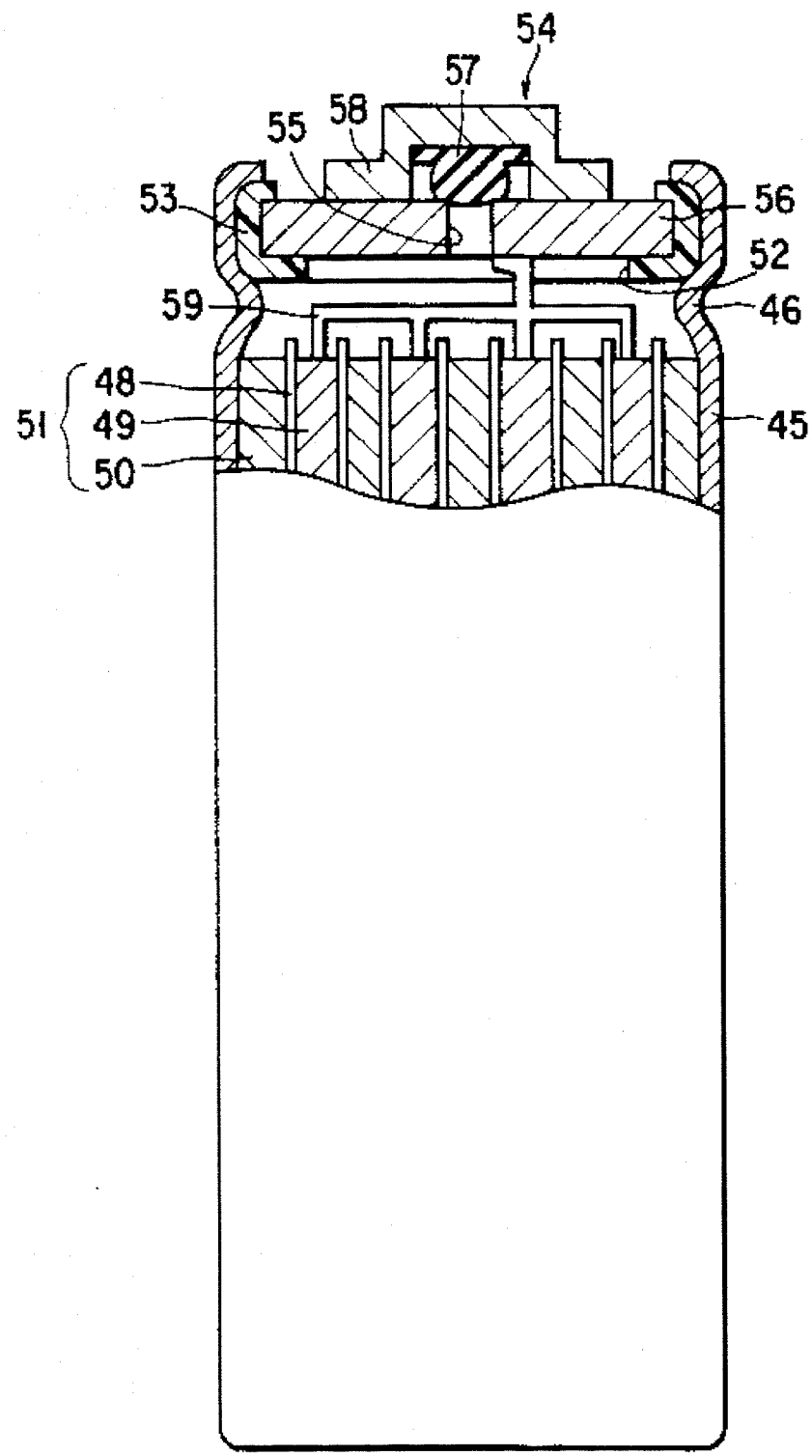

As shown in FIGS. 11G and 11H, a second curling mold 41 is arranged above the lower mold 22. The second curling mold 41 comprises a hollow 39 which is rectangular in cross section and a rectangular recess 40 formed in the bottom in a manner to communicate with the hollow 39 and sized larger than the hollow 39. A knockout 43 having a rectangular frame-like projection 42 formed in the periphery of the lower portion is vertically movable within the hollow 39 and the recess 40. A tapered portion 44 was formed by outwardly expanding by 2° the lower end portion of the recess 40. Further, each corner of the recess 40 has a curvature radius of 0.79 mm.

Let us describe in detail a method of the present invention for manufacturing a rectangular nickel-metal hydride secondary cell.

As shown in FIG. 11A, in the first step, a stepped portion 46 is formed in the upper portion of a metal case 45, which is cylindrical and rectangular in cross section and a has wall thickness of 0.4 mm, by outwardly expanding the upper portion of the metal case 45. The metal case 45 has a longer side $L_1$ of 13.8 mm and a shorter side of 6.8 mm. After the expansion, a rising portion 47 having a longer side $L_2$ of 14.2 mm and a shorter side of 7.2 mm is formed upward of the stepped portion 46. After the expanding step, an electrode group 51 prepared by alternately laminating a positive electrode 49 and a negative electrode 50 is disposed in the metal case 45. The positive electrode 49 is covered with a bag-like separator 48 and contains nickel hydroxide as an active substance. On the other hand, the negative electrode 50 contains a hydrogen absorption alloy as an active substance. Then, an alkali electrolyte is contained in the metal case 45.

Then, a sealing lid group 54 performing a function of preventing explosion and acting as a terminal is mounted on an insulating gasket 53 which is in the form of a rectangular cylinder having a bottom and a rectangular hole 52 formed in the bottom portion. The insulating gasket 53 having the sealing lid group 54 mounted thereon is put on the stepped portion 46 positioned below the rising portion 47 of the metal case 45. The sealing lid group 54 comprises a rectangular sealing plate 56 having a gas releasing hole 55 formed in the center, an elastic valve body 57 formed of, for example, a synthetic rubber, and a hat-shaped terminal cap 58 having a gas releasing hole (not shown) formed therein. The elastic valve body 57 is disposed to cover the gas releasing hole 55 of the sealing plate 56. The terminal cap 58 is arranged to surround the elastic valve body 57 and is welded to the sealing plate 56. Further, a positive electrode lead 59 is connected at one end to the positive electrode 49 and, at the other end, to the lower surface of the sealing plate 56. Under this condition, the metal case 45 is disposed on the lower mold 22, and the first drawing mold 25 is arranged above the metal case 45.

In the next step, the first drawing mold 25 is moved downward, while allowing the projection 26 of the knock-out 27 to hold down the open end portion of the metal case 45, such that the open upper end portion of the metal case 45 is positioned within the hollow 23 of the first drawing mold 25, as shown in FIG. 11B. In this step, the open upper end portion of the metal case 45 is diminished to have the width L3 equal to that in the insulating gasket 53. At the same time, the stepped portion 46 below the open upper end portion of the metal case 45 is moved inward. Then, the first drawing mold 25 is moved upward, while allowing the projection 26 of the knock-out 27 to hold downward the open end portion of the metal case 45, so as to detach the first drawing mold 25 from the metal case 45. Further, the first curling mold 30 having the inner surface of the recess 29 coated with a lubricant is arranged above the metal case 45 after the first drawing mold 25 was removed, as shown in FIG. 11C.

In the next step, the first curling mold 30 is moved downward to allow the projection 31 of the knockout 32 to abut against the sealing plate 56 as shown in FIG. 11D. In this step, the open end portion of the metal case 45 is allowed to abut against the inner surface of the recess 29 of the first curling mold 30 so as to fold inwardly both the open end of the metal case 45 and the rising portion of the insulating gasket 53. Then, the first curling mold 30 is moved upward, while allowing the projection 31 of the knock-out 32 to hold downward the upper surface of the sealing plate 56, so as to detach the first curling mold 30 from the metal case 45. Further, the second drawing mold 36 is arranged above the metal case 45 after the first curling mold 30 was removed, as shown in FIG. 11E.

As shown in FIG. 11F, the second drawing mold 36 is moved downward in the next step, while allowing the projection 37 of the knock-out 38 to hold downward the open end portion of the metal case 45, such that the open end portion of the metal case 45 is positioned within the hollow 34 of the second drawing mold 36. In this step, the open upper end portion of the metal case 45 is diminished to have the width $L_1$ equal to that in the body portion, which is not diminished, of the metal case 45. At the same time, the stepped portion 46 of the metal case 45 is moved inward to have a width $L_4$. After the drawing treatment described above, the second drawing mold 36 is moved upward, while allowing the projection 37 of the knock-out 38 to hold downward the open end portion of the metal case 45, so as to detach the second drawing mold 36 from the metal case 45, followed by arranging the second curling mold 41 above the metal case 45, as shown in FIG. 11G.

The second curling mold 41 is then moved downward, as shown in FIG. 11H. In this step, the inner surface of the recess 40 of the second curling mold 41 is allowed to abut against the open end portion of the metal case 45 so as to curl the open end portion of the metal case 45 and to compress the rising portion of the insulating gasket 53. Finally, the second curling mold 41 is moved upward, while allowing the projection 42 of the knock-out 43 to hold downward the sealing plate 56 so as to detach the second curling mold 41 and the lower mold 22 from the metal case 45 as shown in FIG. 11I and, thus, to finish the sealing process.

In the manufacturing method described above, used is the first curling mold 30 having the hollow 28 formed in the central portion, the hollow 28 being rectangular in cross section, and the rectangular recess 29 formed in the bottom portion to communicate with the hollow 28 and sized larger than the hollow 28, as shown in FIG. 11D and FIG. 13. What should be noted is that the tapered portion 33 is formed in the inner surface in the lower end portion of the rectangular recess 29, making it possible to fold the open end portion of the metal case 45, whose diameter has been diminished, in a desired shape. The tapered portion 33 also serves to occur the space between the periphery in the open end portion of the metal case 45 and the lower end portion of the recess 29, with the result that, in the step of moving the first curling mold 30 upward so as to detach the first curling mold 30 from the metal case 45, it is possible to decrease the friction between the periphery in the open end portion of the metal case 45 and the inner surface of the recess 29. It follows that the first curling mold 30 can be detached quite easily from the an metal case 45, making it possible to obtain a secondary cell with a markedly improved air-tightness. Incidentally, the second curling mold 41 also produces the an effect similar to that produced by the first curling mold 30.

what should also be noted is that, in the manufacturing method described above, the corner portion of the hollow 23 in the first drawing mold 25 has a curvature radius $r_1$ of 0.81 mm. On the other hand, the corner portion of the recess 29 in the first curling mold 30 has a curvature radius $r_2$ of 0.79 mm. In other words, the first drawing mold 25 and the first curling mold 30 used in the method described above meet the requirement of $r_1 > r_2$ specified in the present invention, with the result that the open end portion of the metal case 45 can be diminished the in diameter so as to impart a curvature radius equal to that of the corner of the hollow 23 in the first drawing mold 25 to the corner in the open end portion of the metal case 45. It follows that it is possible to diminish the force exerted on the corner when the open end portion of the metal case 45 is folded inward, making it possible to prevent the metal case 45 from being deformed in the folding step. What should also be noted is that the first curling mold 30 is prevented from biting the corner of the open end portion of the metal case 45, with the result that the first curling mold 30 can be detached more easily from the metal case 45. It follows that it is possible to prevent the reduction in the air-tightness, said reduction being derived from the warping of the sealing plate 56 and from the cracking of the insulating gasket 53. Incidentally, the second drawing mold 36 and the second curling mold 41 also produce effects similar to those produced by the first drawing mold 25 and the first curling mold 30.

As a matter of fact, the secondary cell manufactured in Example 2 was found to exhibit excellent properties, when compared with Comparative Example 1 described below.

Comparative Example 1

A secondary cell was manufactured as in Example 2, except that a tapered portion was not formed in the inner surface in the lower end portion of the recess included in the curling mold. In Comparative Example 1, however, the curling mold was moved upward after the curling process, while allowing the knock-out to hold strongly downward the sealing plate, so as to detach the curling mold from the metal case. As a result, warping of the sealing plate and the dropping of the insulating gasket were found in the manufactured secondary cell.

In each of Example 2 and Comparative Example 1, the holding force exerted by the knock-out on the sealing plate was measured in the step of detaching the curling mold from the metal case after the curling process. The holding force was found to be as small as only 35 kg in Example 2 in contrast to 70 kg for Comparative Example 1.

It should be noted that it is desirable to coat that surface of each of the curling mold and the drawing mold which is brought into contact with the surface of the metal case with a lubricant so as to lower the friction in the contact region.

EXAMPLE 3

The drawing mold and the curling mold used in Example 3 are shown in FIGS. 15A to 15I.

Figure 15B:
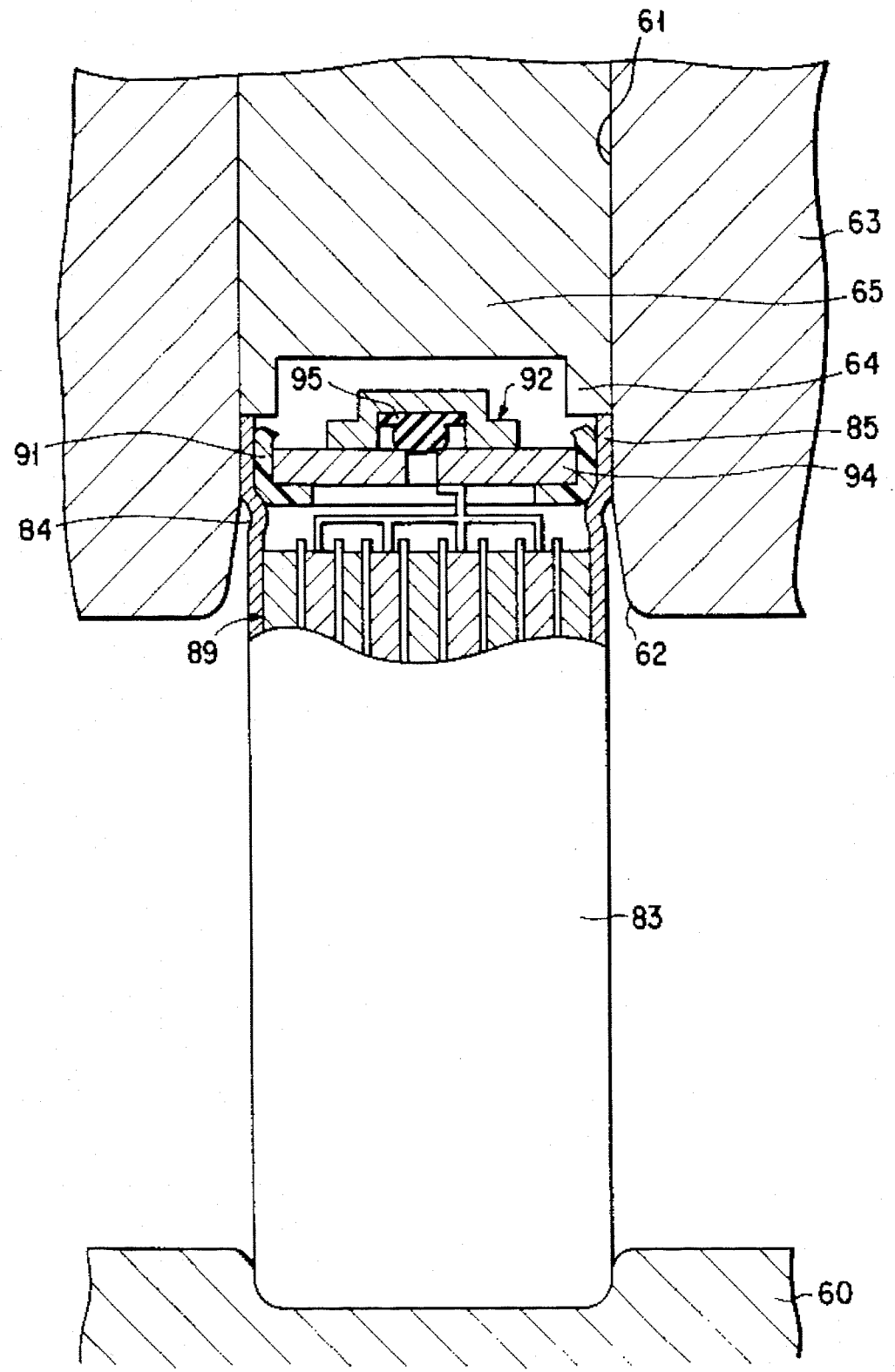

As shown in FIGS. 15A and 15B, a metal case, which is described later, is mounted on a lower mold 60. On the other hand, a first drawing mold 63, which is movable in a vertical direction, is arranged above the lower mold 60. The first drawing mold 63 has a hollow 61 formed in the central portion. Also, the inner surface in the lower portion of the hollow 61 is expanded outward so as to form a tapered portion 62. A knock-out 65 having a rectangular frame-like projection 64 formed in the periphery of the lower portion is movable in a vertical direction within the hollow 61 of the first drawing mold 63. As shown in FIG. 16, the hollow 61 is barrel-shaped in its cross section such that the inner surfaces 66 of the first drawing mold 63 define longer sides of the hollow 61, the longer sides corresponding to outwardly curved side surfaces of a sealing plate which is described later, are curved in a convex configuration. To be more specific, the hollow 61 is sized at 16.62 mm in its longer side $L_5$, at 5.87 mm in its width $L_6$ in the central portion of the curved region, and at 5.72 mm in its shorter side $L_7$, or the end of the curved region.

Figure 15C:
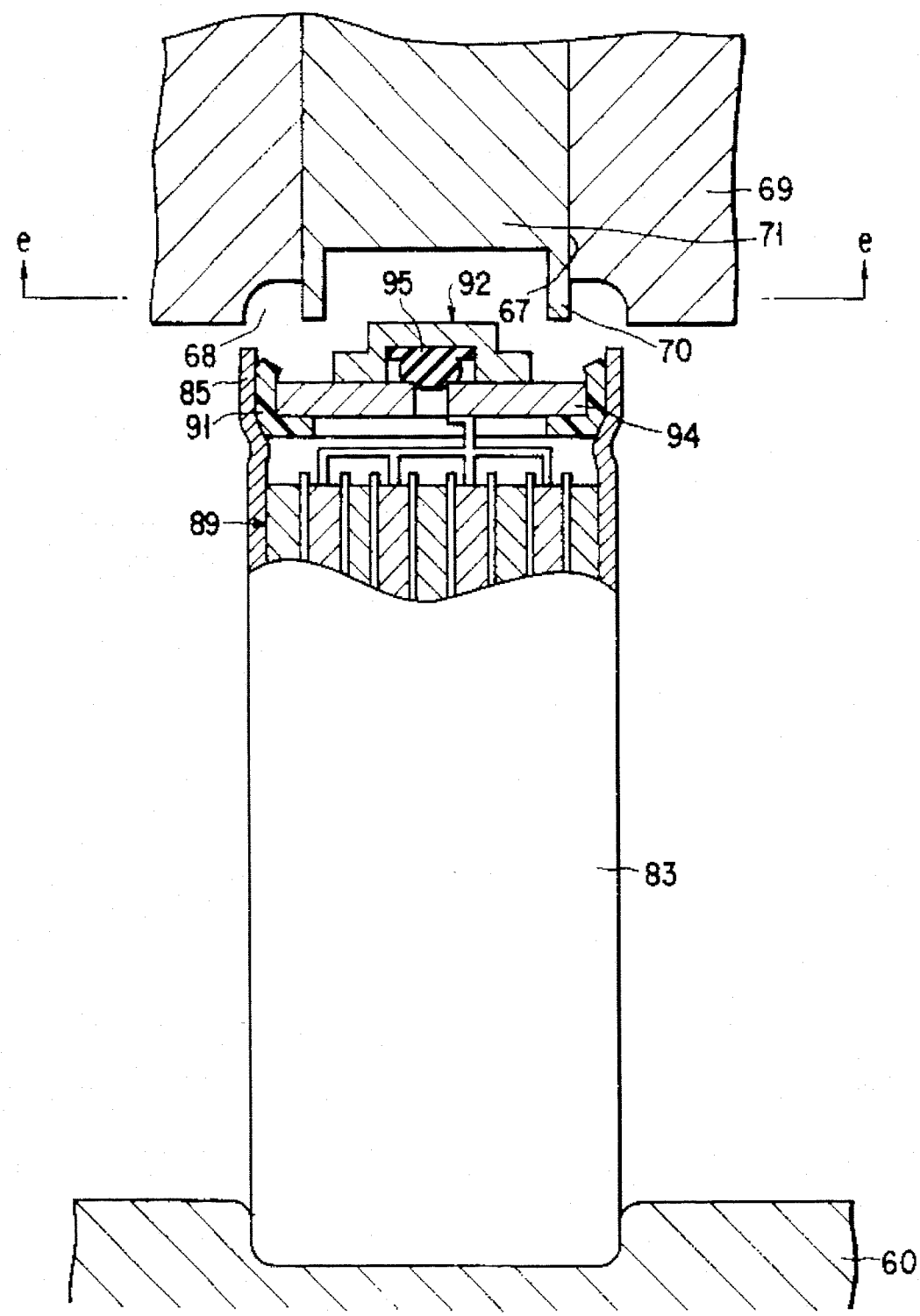
Figure 15D:
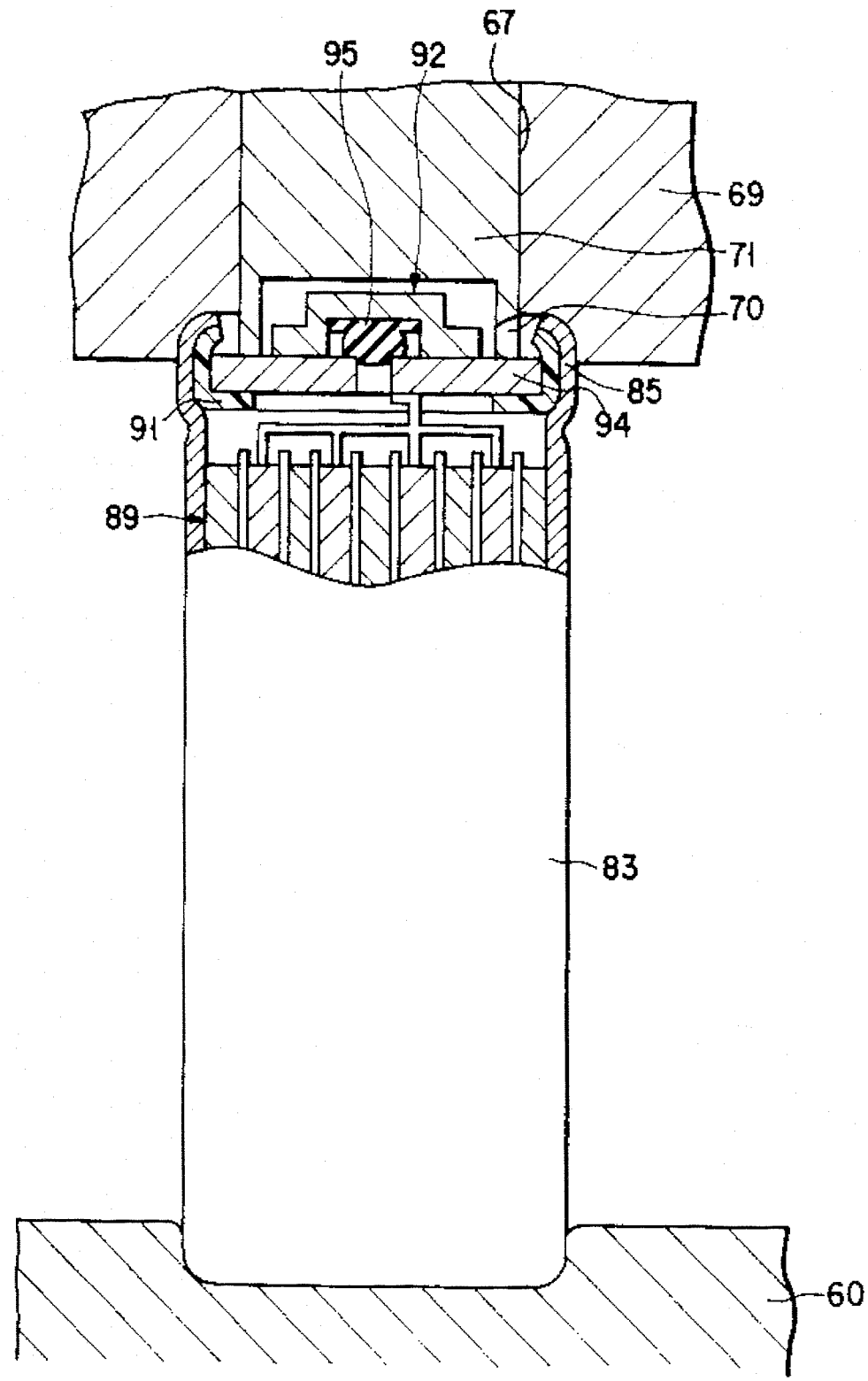

As shown in FIGS. 15C and 15D, a first curling mold 69 movable in a vertical direction is arranged above the lower mold 60. The first curling mold 69 comprises a hollow 67, which has a rectangular cross section and is formed in the central portion of the first curling mold 69, and a rectangular recess 68 communicating with the hollow 67 and sized larger than the hollow 67. A knockout 71 having a rectangular frame-like projection 70 formed in the periphery of the lower portion is movable in a vertical direction within the hollow 67 and the recess 68. As shown in FIG. 17, the recess 68 is barrel-shaped in its cross section such that the inner surfaces 72 of the first curling mold 69 define longer sides of the recess 68, the longer sides corresponding to outwardly curved side surfaces of a sealing plate which is described later, are curved in a convex configuration. To be more specific, the recess 68 is sized at 16.62 mm in its longer side $L_8$, at 5.87 mm in its width $L_9$ in the central portion of the curved region, and at 5.72 mm in its shorter side $L_{10}$, or the end of the curved region.

Figure 15E:
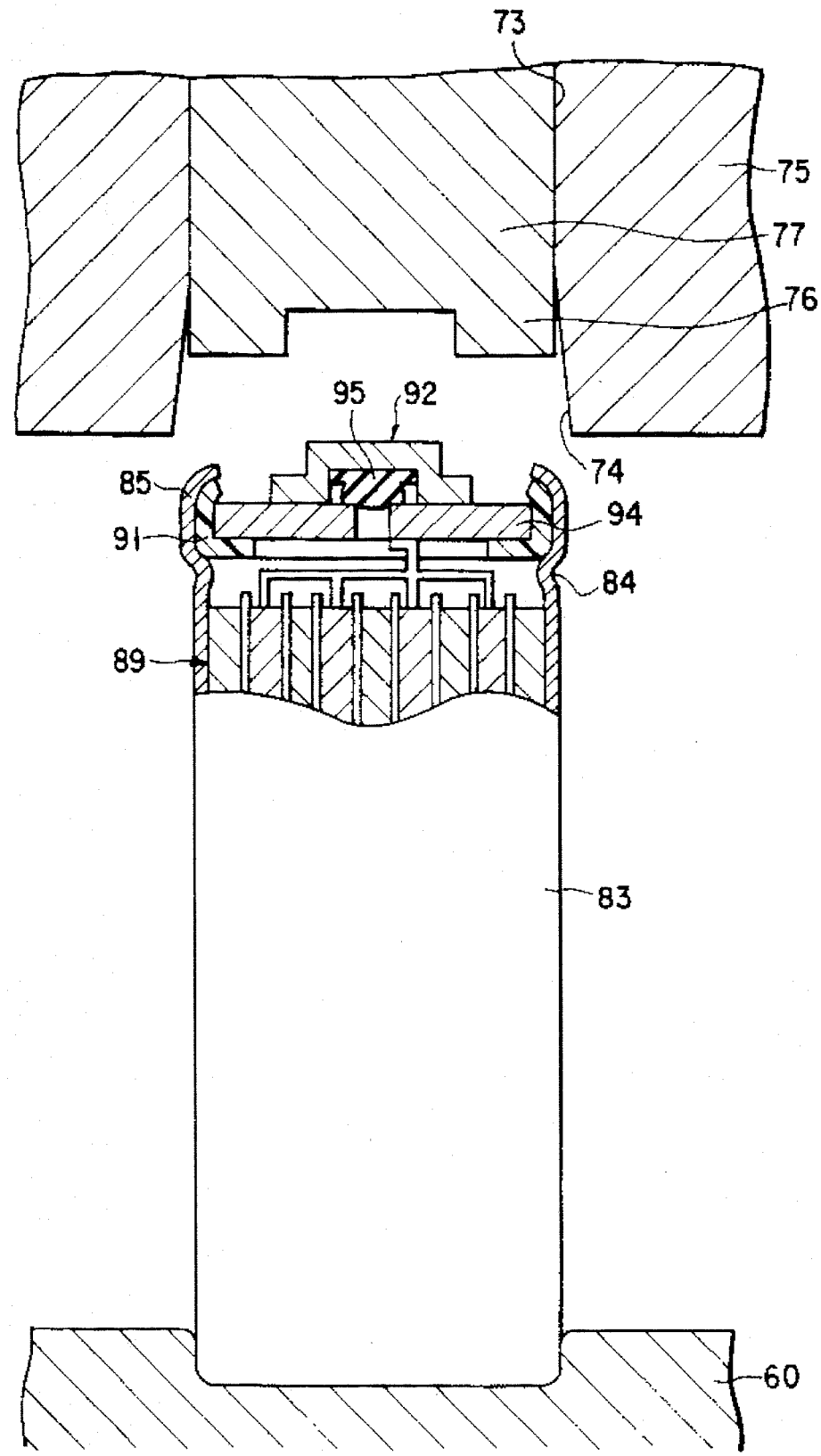

As shown in FIGS. 15E and 15F, a second drawing mold 75 which is movable in a vertical direction is arranged above the lower mold 60. The second drawing mold 75 comprises a hollow 73, which is rectangular in its cross section and formed in the central portion of the second drawing mold 75. The inner surface in the lower end portion of the hollow 73 is outwardly expanded so as to form a tapered portion 74. A knock-out 77 having a rectangular frame-like projection 76 formed in the periphery of the lower portion is movable within the hollow 73. It should be noted that the hollow 73 is barrel-shaped in its cross section such that the inner surfaces define longer sides of the hollow 73, the longer sides corresponding to outwardly curved side surfaces of a sealing plate which is described later, are curved in a convex configuration. To be more specific, the hollow 73 is sized at 16.62 mm in its longer side, at 5.87 mm in its width in the central portion of the curved region, and at 5.72 mm in its shorter side, or the end of the curved region.

Figure 15G:
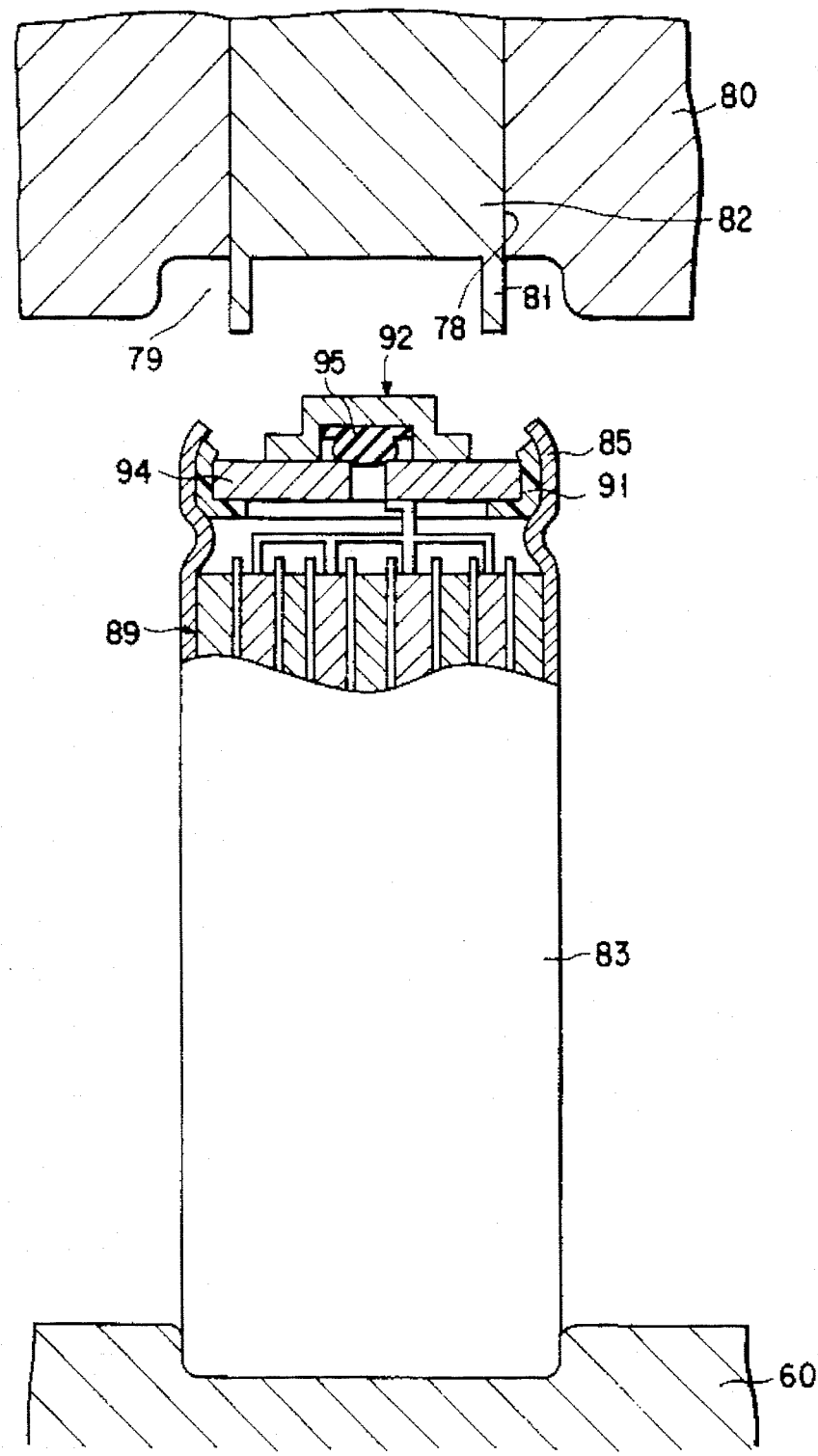
Figure 15H:
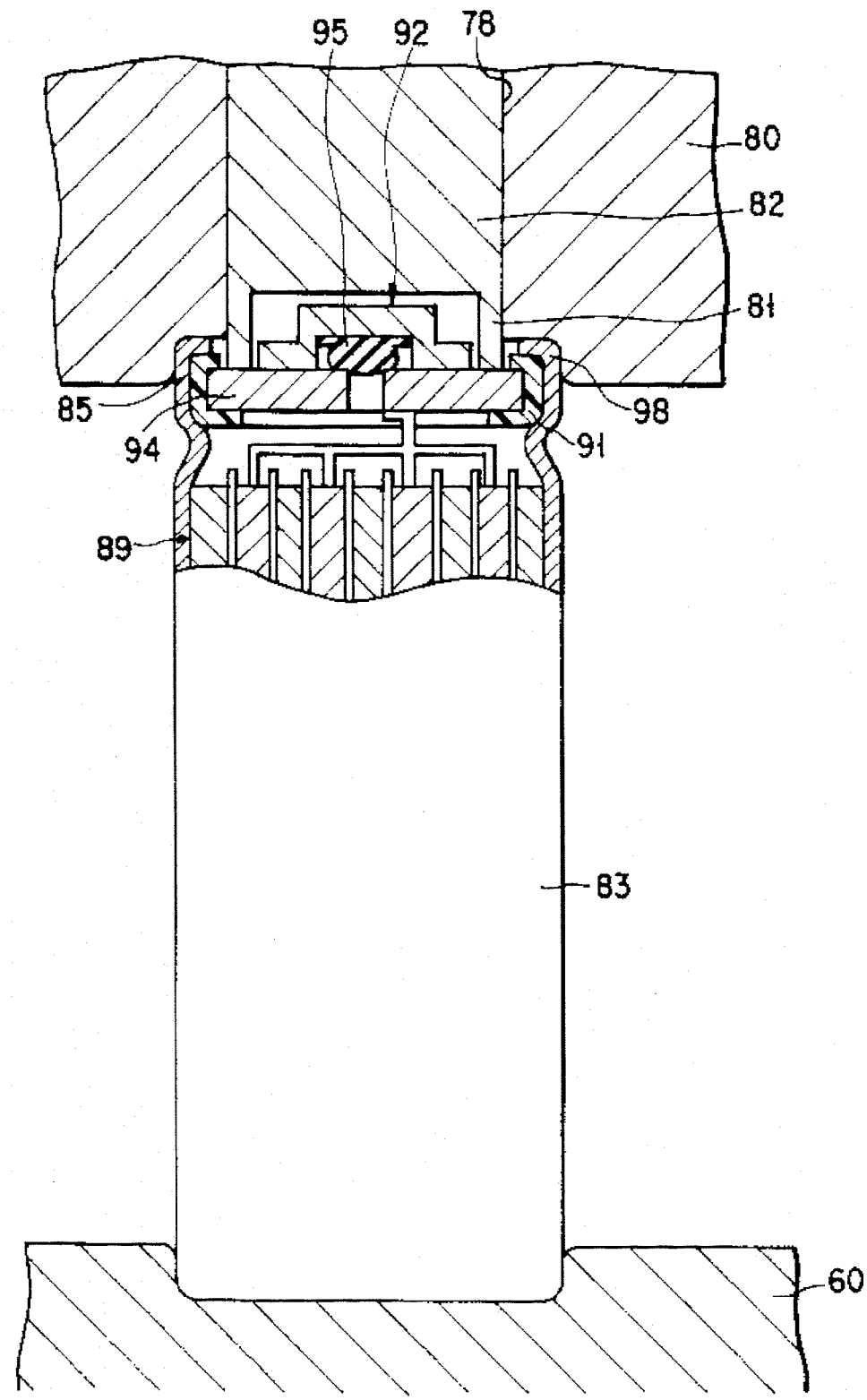

As shown in FIGS. 15G and 15H, a second curling mold 80 movable in a vertical direction is arranged above the lower mold 60. The second curling mold 80 comprises a rectangular hollow 78 and a rectangular recess 79 formed in the bottom to communicate with the hollow 78 and sized larger than the hollow 78. A knockout 82 having a rectangular frame-like projection 81 formed in the periphery of the lower end portion is movable in a vertical direction through the hollow 78 and the recess 79. It should be noted that the recess 79 is barrel-shaped in its cross section such that the inner surfaces defining longer sides of the recess 79, the longer sides corresponding to outwardly curved side surfaces of a sealing plate which is described later, are curved in a convex configuration. To be more specific, the recess 79 is sized at 16.62 mm in its longer side, at 5.87 mm in its width in the central portion of the curved region, and at 5.72 mm in its shorter side, or the end of the curved region.

Let us describe in detail how to manufacture a rectangular nickel-metal hydride secondary cell.

As shown in FIG. 15A, in the first step, a stepped portion 84 is formed in the upper portion of a metal case 83, which is cylindrical and rectangular in cross section and a has wall thickness of 0.4 mm, by outwardly expanding the upper portion of the metal case 83. The metal case 83 has a longer side $L_{11}$ of 16.4 mm and a shorter side of 5.5 mm. After the expansion, a rising portion 85 having a longer side $L_{12}$ of 16.8 mm and a shorter side of 5.9 mm is formed upward of the stepped portion 84. After the expanding step, an electrode group 89 prepared by alternately laminating a positive electrode 87 and a negative electrode 88 is disposed in the metal case 83. The positive electrode 87 is covered with a bag-like separator 86 and contains nickel hydroxide as an active substance. On the other hand, the negative electrode 88 contains a hydrogen absorption alloy as an active substance. Then, an alkali electrolyte is contained in the metal case Then, a sealing lid group 92 performing a function of preventing explosion and acting as a terminal is mounted on an insulating gasket 91 which is in the form of a rectangular cylinder having a bottom and a rectangular hole 90 formed in the bottom portion. The insulating gasket 91 having the sealing lid group 92 mounted thereon is put on the stepped portion 84 positioned below the rising portion 85 of the metal case 83. The sealing lid group 92 comprises a rectangular sealing plate 94 having a gas releasing hole 93 formed in the center, an elastic valve body 95 formed of, for example, a synthetic rubber, and a hat-shaped terminal cap 96 having a gas releasing hole (not shown) formed therein. As shown in FIG. 18, the sealing plate 94 is shaped such that the mutually facing two longer sides are outwardly expanded in the central portion in a convex configuration. To be more specific, the sealing plate 94 is sized at 0.8 mm in wall thickness, at 4.25 mm in the width $L_{13}$ in the central portion of the curved longer side surfaces, and at 4.1 mm in the end of the curved longer side surfaces. In order to improve the air-tightness of the manufactured secondary cell, it is desirable to set the length of the longer side surfaces of the sealing plate 94 at a level not larger than 40 times as much as the thickness of the metal case 83. In this embodiment, the longer side surfaces of the sealing plate 94 is set at 15 mm. The elastic valve body 95 is disposed to cover the gas releasing hole 93 of the sealing plate 94. The terminal cap 96 is arranged to surround the elastic valve body 95 and is welded to the sealing plate 94. Further, a positive electrode lead 97 is connected at one end to the positive electrode 87 and, at the other end, to the lower surface of the sealing plate 94. Under this condition, the metal case 83 is disposed on the lower mold 60, and the first drawing mold 63 is arranged above the metal case 83.

In the next step, the first drawing mold 63 is moved downward, while allowing the projection 64 of the knockout 65 to hold downward the open end portion of the metal case 83, such that the open upper end portion of the metal case 83 is positioned within the hollow 61 of the first drawing mold 63, as shown in FIG. 15B. What should be noted is that the downward movement of the first drawing mold 63 causes the insulating gasket 91 to be somewhat compressed. At the same time, the stepped portion 84 below the open upper end portion of the metal case 83 is moved inward. Then, the first drawing mold 63 is moved upward so as to detach the first drawing mold 63 from the metal case 83. Further, the first curling mold 69 is arranged above the metal case 83 after the first drawing mold 63 was removed, as shown in FIG. 15C.

In the next step, the first curling mold 69 is moved downward to allow the projection 70 of the knockout 71 to abut against the sealing plate 94 as shown in FIG. 15D. In this step, the open end portion of the metal case 83 is allowed to abut against the inner surface of the recess 68 of the first curling mold 69 so as to fold inwardly both the open end of the metal case 83 and the rising portion of the insulating gasket 91. Then, the first curling mold 69 is moved upward so as to detach the first curling mold 69 from the metal case 83. Further, the second drawing mold 75 is arranged above the metal case 83 after the first curling mold 69 was removed, as shown in FIG. 15E.

As shown in FIG. 15F, the second drawing mold 75 is moved downward in the next step, while allowing the projection 76 of the knock-out 77 to hold downward the open end portion of the metal case 83, such that the open end portion of the metal case 83 is positioned within the hollow 73 of the second drawing mold 75. In this step, the open upper end portion of the metal case 83 is diminished to have the width $L_{11}$ equal to that in the body portion, which is not diminished, of the metal case 83. At the same time, the stepped portion 84 of the metal case 83 is moved inward to have a width $L_{15}$ of 15.4 mm. After the drawing treatment described above, the second drawing mold 69 is moved upward so as to detach the second drawing mold 75 from the metal case 83, followed by arranging the second curling mold 80 above the metal case 83 after the second drawing mold 75 was removed, as shown in FIG. 15G.

The second curling mold 80 is then moved downward to allow the projection 81 of the knock-out 82 to abut against the sealing plate 94 as shown in FIG. 15H. In this step, the inner surface of the recess 79 of the second curling mold 80 is allowed to abut against the open end portion of the metal case 83 so as to further fold inward the open end portion of the metal case 83 and the rising portion of the insulating gasket 91. As a result, formed is a folded portion 98 along the periphery of the sealing plate 94 such that the folded portion 98 conforms with the side surfaces of the sealing plate 94, the longer side surfaces being expanded outward in a convex configuration. Finally, the second curling mold 80 and the lower mold 60 are detached from the metal case 83 as shown in FIG. 15I so as to obtain a rectangular nickel-metal hydride secondary cell.

In the manufacturing method described above, the diameter of the open end portion of the metal case 83 is diminished by using the first drawing mold 63 having the inner surface 66 of the hollow 61, which corresponds to the curved side surfaces of the sealing plate 94, expanded outward in a convex form. As shown in FIG. 19 the open end portion of the metal case 83 can be folded inward in a manner to conform with the curved side surfaces of the sealing plate 94 by using the first curling mold 69 having the inner surface 72 of the recess 60, which corresponds to the curved side surfaces of the sealing plate 94, expanded outward in a convex. As a result, it is possible to prevent the insulating gasket 91 interposed between the folded portion 98 of the metal case 83 and the curved side surfaces of the sealing plate 94 from being compressed excessively, making it possible to prevent the sealing plate 94 from being deformed and, thus, to improve the air-tightness of the secondary cell.

What should also be noted is that, in the present invention, the open end portion of the metal case 83 is inwardly folded to conform with the curved side surfaces of the sealing plate 94, as described above. The particular folding of the open end portion of the metal case 83 makes it possible to suppress the bending of the longer sides of the open end portion of the metal case 83, the bending being possibly caused by the pressure of the gas generated within the metal case 83 by, for example, short-circuiting or over-charging of the secondary cell. It follows that it is possible to maintain a high air-tightness in the event of the pressure increase within the metal case 83. Incidentally, the second drawing mold 75 and the second curling mold 80 also produce effects similar to those produced by the first drawing mold 63 and the first curling mold 69.

As a matter of fact, the secondary cell prepared in Example 3 was found to exhibit excellent properties, when compared with Comparative Example 2 which follows.

Comparative Example 2

A secondary cell was manufactured as in Example 3, except that used in Comparative Example 2 was a drawing mold, in which the inner surface of the hollow was flat, and a curling mold, in which the inner surface of the recess was flat. In Comparative Example 2, the sealing plate of the secondary cell was excessively pushed by the insulating gasket in the sealing process so as to give rise to deformation by warping. Incidentally, the secondary cell in each of Example 3 and Comparative Example 2 was not provided with an explosion-preventing mechanism for the pressure resistance test described below.

Specifically, 10 secondary cell samples were prepared for each of Example 3 and Comparative Example 2. A pressure boosting device was mounted to the main body portion of the metal case in each of the secondary cell samples so as to measure the gas pressure at which a gas leaks from the sealing portion of the secondary cell to the outside. The particular gas pressure was measured by a pressure sensor, with the results as shown in Table 3.

TABLE 3

|  | Gas pressure (kg/cm$^2$) |
| --- | --- |
| Example 3 | 11 to 13 |
| Comparative Example 2 | 2 to 11 |

As apparent from Table 3, the secondary cell manufactured by the method of Example 3 was found to exhibit such a high pressure resistance as 11 to 13 kg/cm$^2$. In other words, the secondary cell was found to exhibit a markedly improved air-tightness. On the other hand, the secondary cell manufactured by the method of Comparative Example 2 was found to exhibit a pressure resistance as low as only 2 to 11 kg/cm$^2$. As a matter of fact, warping was recognized in the sealing plate included in the cell manufactured by the method of Comparative Example 2.

EXAMPLES 4 TO 8

FIG. 20 shows the construction of a rectangular nickel-metal hydride secondary cell prepared in each of Examples 4 to 8.

In the first step, a stepped portion 100 was formed by outwardly expanding the open end portion of a metal case 99, which also acts as a negative electrode terminal and is in the form of a rectangular cylinder having a bottom. Then, an electrode group 104 prepared by laminating a positive electrode 102 and a negative electrode 103 one upon the other was housed in the metal case 99. The positive electrode 102 noted above was held between two parts of a separator 101 which was folded to have the positive electrode 102 wrapped therein and contained nickel hydroxide as an active substance. On the other hand, the negative electrode 103 contained a hydrogen absorption alloy as an active substance. An alkali electrolyte was contained in the metal case 99.

In the next step, a sealing lid group 107, which performs the explosion-preventing function and acts as a positive electrode terminal, was mounted on an insulating gasket 106, which had a bottom, which was rectangular in cross section, and had a rectangular hole 105 formed in the bottom. The sealing lid group 107 noted above comprised a sealing plate 109 having a gas releasing hole 108 formed in the central portion, an elastic valve body 110 made of, for example, a synthetic rubber, and a hat-shaped terminal cap 111 having a gas releasing hole (not shown) formed therein. The elastic valve body 110 is disposed on the sealing plate 109 to close the gas releasing hole 108. The terminal cap 111 is arranged to surround the elastic valve body 110 and is welded to the sealing plate 109.

After the sealing lid group 107 was mounted on the insulating gasket 106, a positive electrode lead 112 having one end connected to the positive electrode 102 was connected at the other end to the lower surface of the sealing plate 109. Then, the insulating gasket 106 having the sealing lid group 107 mounted thereon was mounted on the stepped portion 100 of the metal case 99. Further, the sealing lid group 107 was hermetically fixed to the metal case 99 with the insulating gasket 106 interposed therebetween.

In the next step, the secondary cell assembled as described above was charged by 150% at 0.1 CmA, followed by applying the discharging and, then, aging treatment to the secondary cell under the conditions given in Table 4 below so as to activate the negative electrode and, thus, to prepare a secondary cell having a capacity of 600 mAh. Incidentally, the residual capacity in the discharging step, which is shown in Table 4, denotes the ratio of the residual capacity to the entire discharge capacity of the secondary cell.

TABLE 4

| | Discharge conditions before aging | | | Conditions of aging | |
| --- | --- | --- | --- | --- | --- |
| | Discharge current (Cm A) | Cut-Off Voltage (V) | Residual capacity (%) | Temperature (°C.) | Time (Hr) |
| Example 4 | 1 | 1.0 | 20 | 25 | 72 |
| Example 5 | 1 | 1.0 | 20 | 45 | 24 |
| Example 6 | 1 | 0.8 | 13 | 25 | 72 |
| Example 7 | 1 | 0.8 | 13 | 45 | 24 |
| Example 8 | 0.2 | 1.0 | 4 | 25 | 72 |

Comparative Examples 3 and 4

Secondary cells were prepared as in Examples 4 to 8, except that the assembled secondary cells were subjected to the discharge and aging treatments under the conditions shown in Table 5:

TABLE 5

| | Discharge conditions before aging | | | Conditions of aging | |
|---|---|---|---|---|---|
| | Discharge current (Cm A) | Cut-Off Voltage (V) | Residual capacity (%) | Temparature (°C.) | Time (Hr) |
| Comparative Example 3 | 1 | 1.0 | 20 | Not performed | Not performed |
| Comparative Example 4 | 1 | 1.1 | 29 | 25 | 72 |

A capacity screening test was applied to each of the secondary cells prepared in Examples 4 to 8 and Comparative Examples 3 and 4 by charging the secondary cell by 130% at 1 CmA, followed by discharging the cell to 1.0 V with 1 CmA so as to measure the discharge capacity. Then, the cell was charged again by 150% with 0.2 C so as to measure the discharge capacity and the average discharge voltage in the case of discharging the cell at 1 C with the cut-off voltage set at 1 V.

Figure 21:
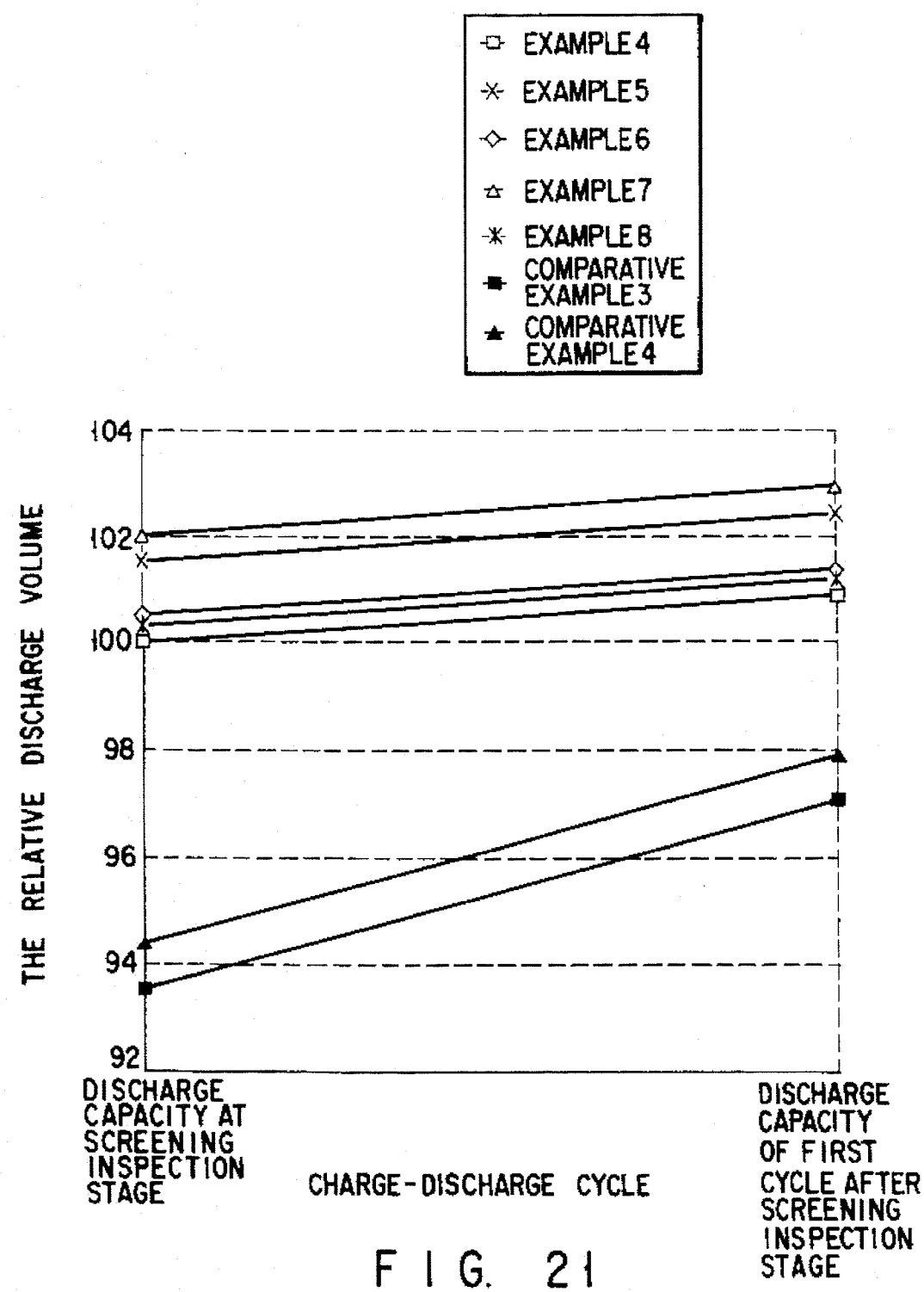
FIG. 21 is a graph showing the increases in the discharge capacity ratio at the first charging-discharging cycle based on the values at the time of the capacity screening inspection in respect of the rectangular nickel-metal hydride secondary cells manufactured in Examples 4 to 8 of the present invention.

FIG. 21 shows the result in respect of the discharge capacity ratio in terms of the discharge capacity at the time of the capacity screening inspection and the discharge capacity at the first charging-discharging cycle after the capacity screening inspection. The discharge capacity at the screening inspection of the secondary cell prepared in Example 4 was set at 100 in determining the data plotted in the graph of FIG. 21. On the other hand, Table 6 below shows the average discharge voltage in the first charging-discharging cycle after the capacity screening inspection:

TABLE 6

| | Average discharge voltage (V) |
|---|---|
| Example 4 | 1.1927 |
| Example 5 | 1.1999 |
| Example 6 | 1.1948 |
| Example 7 | 1.2050 |
| Example 8 | 1.1960 |
| Comparative Example 3 | 1.1764 |
| Comparative Example 4 | 1.1795 |

FIG. 21 and Table 6 collectively show that the secondary cells prepared in Examples 4 to 8 exhibit sufficiently improved discharge capacity and average discharge voltage in each of the screening inspection time and the first charging-discharging cycle after the screening inspection time. What should be noted is that the secondary cell prepared in the Examples of the present invention permits decreasing the difference in the discharge capacity between the screening inspection time and the first charging-discharging cycle after the screening inspection time. This indicates that the screening inspection is carried out with a high accuracy in the present invention.

when it comes to the secondary cell prepared in each of Comparative Examples 3 and 4, however, the activation degree was insufficient, leading to very low discharge capacity and the average discharge voltage in the screening inspection time. Also, since the difference in the discharge capacity was large between the screening inspection time and the first charging-discharging cycle after the screening inspection time, the accuracy of the screening inspection tends to be lowered.

Figure 22:
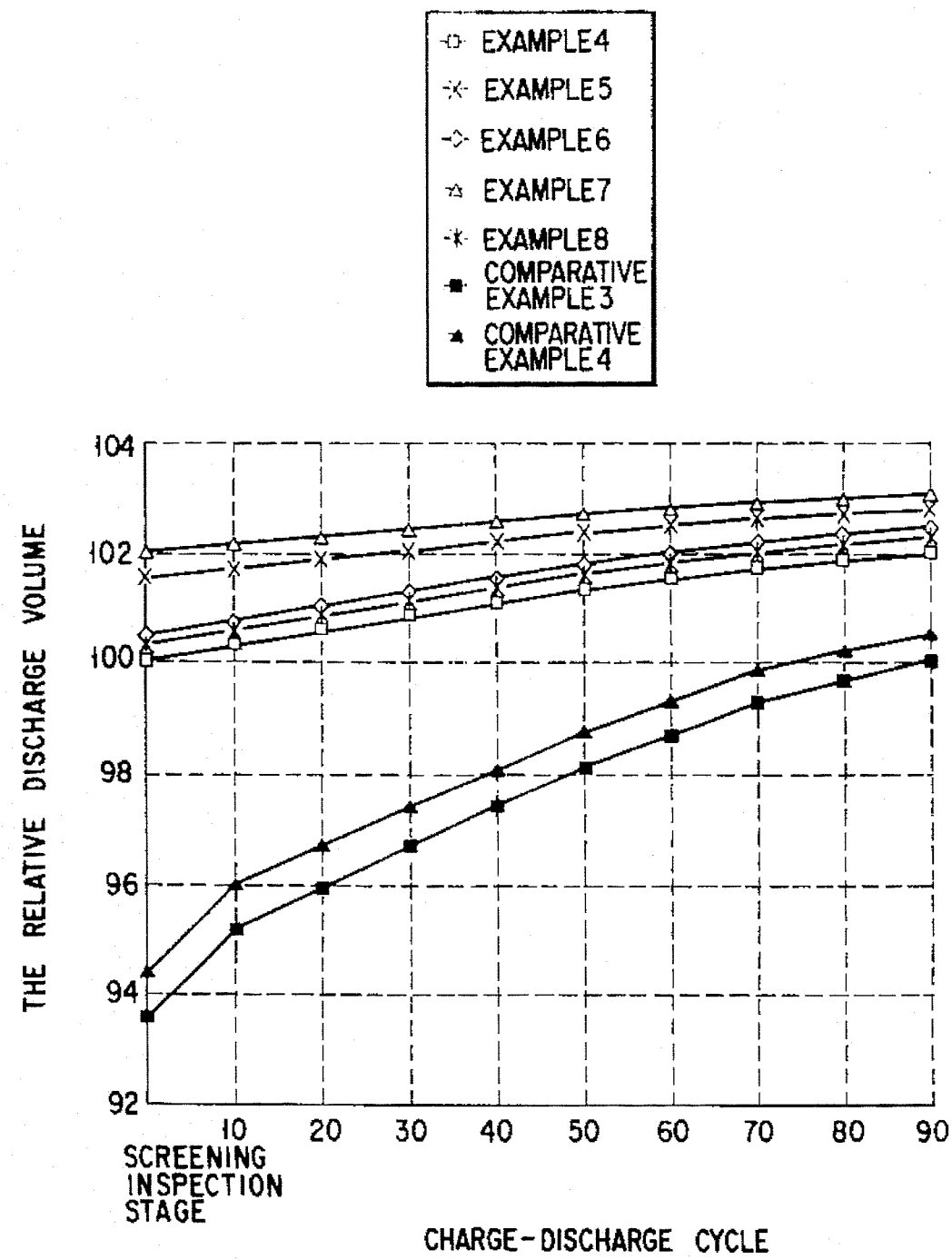
FIG. 22 is a graph showing the changes in the discharge capacity ratio relative to the number of times of the charging-discharging cycles in respect of the rectangular nickel-metal hydride secondary cells manufactured in Examples 4 to 8 of the present invention.

Further, charging-discharging cycles were applied 90 times to each of the secondary cells prepared in Examples 4 to 8 and Comparative Examples 3 and 4 so as to measure the change in the discharge capacity. In each of the charging-discharging cycle, the secondary cell was charged first by 125% with 1 C, followed by discharging the charged secondary cell with 1C, with the cut-off voltage set at 1 V. FIG. 22 is a graph showing the results of the test. To be more specific, the data changing in the discharge capacity ratio relative to the number of charging-discharging cycles were plotted in the graph of FIG. 22. The discharge capacity at the screening inspection of the secondary cell prepared in Example 1 was set at 100 in determining the data plotted in the graph of FIG. 22.

FIG. 22 clearly shows that the secondary cell prepared in each of Examples 4 to 8 permits maintaining a high discharge capacity ratio over the entire period of the test starting with the initial stage of the charging-discharging cycle test. It is seen from FIG. 22 that the particular tendency remains unchanged even after completion of the 90th cycle. When it comes to each of the secondary cells prepared in Comparative Examples 3 and 4, however, the discharge capacity ratio in the initial stage of the charging-discharging cycles was markedly lower than that of the secondary cells prepared in Examples 4 to 8. As a matter of fact, the discharge capacity ratio in Comparative Examples 3 and 4 can certainly be improved after a 90th charging-discharging cycle to a level substantially equal to that in the starting time of the charging-discharging cycle for the secondary cells prepared in Examples 4 to 8. However, a marked difference is recognized in the discharge capacity ratio between the initial stage of the charging-discharging cycles and the completion time of 90th charging-discharging cycle. In other words, the data for Comparative Examples 3 and 4 are markedly increased with an increase in the number of charging-discharging cycles, as shown in FIG. 22.

The current value employed in the charging-discharging step in Examples 4 to 8 need not be restricted to that described previously. For example, it is also possible to employ a step charging-discharging operation in which the current value is changed stepwise.

As described above in detail, the present invention provides a rectangular nickel-metal hydride secondary cell which permits preventing the open end portion of a metal case from being deformed when the open end portion noted above is folded inward and which also permits maintaining a high air-tightness.

The present invention also provides a method of manufacturing a rectangular nickel-metal hydride secondary cell, which permits folding the open end portion of a metal case after a diameter-diminishing treatment in a desired shape, which permits easily detaching a curling mold from the metal case, and which also permits preventing reduction of reliability which would be caused by, for example, the warping of the sealing plate.

The present invention also provides a method of manufacturing a rectangular nickel-metal hydride secondary cell, which permits preventing a sealing plate from being deformed in the sealing process and also permits improving the air-tightness of the secondary cell.

Further, the present invention provides a method of manufacturing a rectangular nickel-metal hydride secondary cell, which permits sufficiently improving the discharge capacity and the discharge voltage before the screening inspection so as to improve the accuracy of the screening inspection.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A method of manufacturing a rectangular nickel-metal hydride secondary cell, comprising the steps of:

applying at least one cycle of charging-discharging cycles to a rectangular nickel-metal hydride secondary cell including a rectangular metal case having a bottom, an electrode group housed in said metal case, and an alkali electrolyte contained in said metal case, said electrode group being constructed such that a nickel positive electrode and a hydrogen absorption alloy negative electrode are superposed one upon the other with a separator interposed between the adjacent positive and negative electrodes;

permitting said secondary cell with a small residual capacity to stand for aging for a time required for activating said negative electrode; and fully charging said secondary cell after said aging step, followed by discharging said secondary cell and subsequently performing a capacity screening inspection of said secondary cell.

2. The method according to claim 1, wherein said secondary cell with the small residual capacity is left to stand for aging at a temperature falling within a range of between 25° C. and 60° C.

3. The method according to claim 1, wherein said alkali electrolyte is based on potassium hydroxide and is contained in said metal case in an amount not larger than 90% by volume of free space of said metal case and at least 1.7 ml/Ah of the cell capacity, and the free space of said metal case is determined by subtracting an effective volume of said electrode group from a volume occupied by said electrode group represented by A×B, where A denotes a length of said electrode group and B represents the bottom area of said metal case.

4. The method according to claim 1, wherein said rectangular nickel-metal hydride secondary cell comprises said metal case, said electrode group, said alkali electrolyte, a rectangular sealing plate mounted near an open end portion of said metal case, and an insulating gasket made of a synthetic resin and interposed in a compressed state between an inner wall near an open end of said metal case and a peripheral portion of said sealing plate.

5. The method according to claim 4, wherein said insulating gasket is made of a polyamide series resin containing carbon black or graphite.

6. A method of manufacturing a rectangular nickel-metal hydride secondary cell, comprising the steps of:

constructing a rectangular nickel-metal hydride secondary cell including a rectangular metal case having a bottom, an electrode group housed in said metal case, and an alkali electrolyte contained in said metal case, said electrode group being constructed such that a nickel positive electrode and a hydrogen absorption alloy negative electrode are superposed one upon the other with a separator interposed between the adjacent positive and negative electrodes;

applying at least one cycle of charging-discharging to the constructed rectangular nickel-metal hydride secondary cell;

permitting said secondary cell with a small residual capacity to stand for aging for a time required for activating said negative electrode;

fully charging said secondary cell after said aging step, followed by discharging said secondary cell; and performing a capacity screening inspection of said secondary cell.

7. The method according to claim 6, wherein said secondary cell with the small residual capacity is left to stand for aging at a temperature falling within a range of between 25° C. and 60° C.

8. The method according to claim 6, wherein said alkali electrolyte is based on potassium hydroxide and is contained in said metal case in an amount not larger than 90% by volume of free space of said metal case and at least 1.7 ml/Ah of the cell capacity, and the free space of said metal case is determined by subtracting an effective volume of said electrode group from a volume occupied by said electrode group represented by A×B, where A denotes a length of said electrode group and B represents the bottom area of said metal case.

9. The method according to claim 6, wherein said rectangular nickel-metal hydride secondary cell comprises said metal case, said electrode group, said alkali electrolyte, a rectangular sealing plate mounted near an open end portion of said metal case, and an insulating gasket made of a synthetic resin and interposed in a compressed state between an inner wall near an open end of said metal case and a peripheral portion of said sealing plate.

10. The method according to claim 9, wherein said insulating gasket is made of a polyamide series resin containing carbon black or graphite.

* * * * *